(12) United States Patent
Tsou et al.

(10) Patent No.: US 7,954,528 B2
(45) Date of Patent: Jun. 7, 2011

(54) THERMOPLASTIC ELASTOMER COMPOSITION AND PROCESS FOR PRODUCING SAME

(75) Inventors: Andy Haishung Tsou, Houston, TX (US); Yoshihiro Soeda, Hiratsuka (JP); Yuichi Hara, Hiratsuka (JP); Matthew Brian Measmer, Deer Park, TX (US)

(73) Assignees: ExxonMobil Chemical Patents Inc., Houston, TX (US); The Yokohama Rubber Co., Ltd., Tokyo (JP)

( * ) Notice: Subject to any disclaimer, the term of this patent is extended or adjusted under 35 U.S.C. 154(b) by 427 days.

(21) Appl. No.: 12/091,333

(22) PCT Filed: Oct. 27, 2005

(86) PCT No.: PCT/US2005/038824
§ 371 (c)(1),
(2), (4) Date: Apr. 24, 2008

(87) PCT Pub. No.: WO2007/050071
PCT Pub. Date: May 3, 2007

(65) Prior Publication Data
US 2008/0255310 A1   Oct. 16, 2008

(51) Int. Cl.
*C08L 51/04* (2006.01)
*C08L 77/00* (2006.01)
*C08L 101/00* (2006.01)
*B60C 15/00* (2006.01)
*C08K 5/098* (2006.01)

(52) U.S. Cl. ........ 152/510; 152/543; 152/547; 525/178; 525/179; 525/184; 525/326.3

(58) Field of Classification Search ................. 525/178, 525/179, 184, 326.3; 152/510, 543, 547
See application file for complete search history.

(56) References Cited

U.S. PATENT DOCUMENTS

| 5,244,961 A | 9/1993 | Yu et al. |
| 6,491,992 B1 | 12/2002 | Koizumi et al. |
| 2003/0181592 A1 | 9/2003 | Watanabe et al. |

FOREIGN PATENT DOCUMENTS

| EP | 0 969 039 | 1/2000 |
| RU | 2107702 C1 | 3/1998 |

OTHER PUBLICATIONS

Practical Technology of Rubber; Yang Qingzhi, Chemical Industry Press, Jun. 1, 2005.
Decision to Grant dated Jun. 22, 2010 issued in related Russian Patent Application No. 2008121190.

*Primary Examiner* — Ana L Woodward
(74) *Attorney, Agent, or Firm* — Connolly Bove Lodge & Hutz LLP

(57) ABSTRACT

A thermoplastic elastomer composition having excellent durability and flexibility while possessing superior air impermeability. In particular, a process for producing a thermoplastic elastomer composition having high rubber content by multistage addition of at least one vulcanizable rubber component, in which the time required to substantially cure the at least one rubber component preferably is less the mixer residence time. Such compositions are particularly useful in applications such as tire innerliners and barrier films or layers.

20 Claims, 1 Drawing Sheet

20 micron by 20 micron AFM Image of Example 13
(Light phase: Nylon; dark particulate phase: BIMS)

US 7,954,528 B2

THERMOPLASTIC ELASTOMER COMPOSITION AND PROCESS FOR PRODUCING SAME

CROSS-REFERENCE TO RELATED APPLICATIONS

This application is a national phase of PCT/US2005/038824, filed on Oct. 27, 2005, the entire contents of all are hereby incorporated by reference.

FIELD OF THE INVENTION

The present invention relates to thermoplastic elastomer compositions particularly useful for tire and other industrial rubber applications and to processes for producing such compositions.

BACKGROUND OF THE INVENTION

Thermoplastic elastomer compositions are particularly useful for tire and other industrial rubber applications. For example EP 0 722 850 B1 discloses a low-permeability thermoplastic elastomer composition that is superior as a gas-barrier layer in pneumatic tires. This thermoplastic elastomer composition comprises a low-permeability thermoplastic matrix, such as polyamide or a blend of polyamides, in which there is dispersed a low-permeability rubber, such as brominated poly(isobutylene-co-paramethylstyrene). In EP 0 857 761 A1 and EP 0 969 039 A1, the viscosity ratio of the thermoplastic matrix and the dispersed rubber phase was specified both as a function of the volume fraction ratio and, independently, to be close to a value of one in order to produce a high concentration of small particle size vulcanized rubber particles dispersed in a thermoplastic phase. EP 0 969 039 A1 further discloses that small particle size rubber dispersed in a thermoplastic resin matrix was important in order to achieve acceptable durability of the resulting composition, particularly where such compositions are intended to be used as innerliners in pneumatic tires.

Compositions exhibiting low gas permeability performance (i.e., functioning as a gas barrier) composed of thermoplastic resin/thermoplastic resin-based blends such as a high density polyethylene resin and nylon 6 or nylon 66 (HDPE/PA6.66), a polyethylene terephthalate and aromatic nylon (PET/MXD6), a polyethylene terephthalate and vinyl alcohol-ethylene copolymer (PET/EVOH), where one thermoplastic resin is layered over the other layer to form plural layers by molding, and processes for producing the same, are disclosed, for example, by I. Hata, Kobunshi (Polymers), 40 (4), 244 (1991). Further, an application regarding the use of such a composition as the innerliner layer of a tire is disclosed in Japanese Patent Application No. 7-55929. However, since these materials are thermoplastic resin/thermoplastic resin blends, while they are superior in gas barrier performance, they lack flexibility, and therefore, such films are liable to break when the tire is in use.

Further, there are also examples of the use of a thermoplastic elastomer composed of a rubber and a thermoplastic resin for use as an innerliner or in a tire; see, Japanese Patent Application No. 8-183683, but in general, a flexible material of the type disclosed therein and having superior durability has low heat resistance. With a thermoplastic elastomer using a thermoplastic resin having a melting point less than the tire vulcanization temperature as a matrix, when the tire vulcanization bladder is released at the end of the tire vulcanization cycle, the tire inside surface is subject to appearance defects due to the thermoplastic resin sticking to or rubbing with the bladder.

Control of the viscosity difference between the rubber and resin during mixing in order to reduce the particle size of the dispersed rubber has been reported by S. Wu, Polym. Eng. Sci., 27(5), 1987. Wu reported that the dispersed rubber particle size was reduced where the ratio of melt viscosities of the rubber/resin is brought close to 1, that is, no difference in viscosities. However, it is reported in EP 0 969 039 A1 that, in attempting to fabricate a thermoplastic elastomer composition having sufficient flexibility, strength and elongation, as well as superior durability, by increasing the rubber ratio, and keeping the ratio of melt viscosities of the rubber/resin at 1, the rubber becomes the matrix and the composition no longer exhibits thermoplasticity.

In Japanese Patent Application Nos. 8-193545, 9-175150, and 10-235386 it is proposed that, in a laminate structure in which dynamic fatigue resistance is required, such as tire or a hose, when using a gas permeation preventive thermoplastic elastomer composition composed of rubber/resin dispersed therein, it is known to obtain a balance between the flexibility and gas permeation preventive property by making use of a blend of flexible N11-nylon or N12-nylon and the superior gas permeation preventive property of N6-nylon or N66-nylon. Further, it was proposed to define volume fraction and melt viscosity using the following equation:

$$(\phi_d/\phi_m) \times (\eta_m/\eta_d) < 1.0$$

wherein the volume fractions of the continuous phase component and dispersion phase component in the thermoplastic elastomer composition are $\phi_m$ and $\phi_d$ and the melt viscosities of the components are $\eta_m$ and $\eta_d$ and further to bring the ratio of viscosities $\eta_m/\eta_d$ close to 1 to reduce the dispersed rubber particle size domain to improve the durability. However, it is reported in EP 0 969 039 A1 that the durability at low temperatures was insufficient by just reducing the rubber particle size.

The limitations of the previous approaches to achieving improved performance of the desirable compositions comprising a small particle size rubber domain dispersed in a thermoplastic matrix, the composition exhibiting improved fluid (gas or liquid) barrier properties and desirable levels of strength and durability suitable for use in tires and hose applications has been accomplished by use of the processes of the present invention.

Other references of interest include: WO 2004/081107, WO 2004/081106, WO 2004/081108, WO 2004/081116, WO 2004/081099, U.S. Pat. No. 4,480,074, U.S. Pat. No. 4,873,288, U.S. Pat. No. 5,073,597, U.S. Pat. No. 5,157,081, U.S. Pat. No. 6,079,465, U.S. Pat. No. 6,346,571, and U.S. Pat. No. 6,538,066.

SUMMARY OF THE INVENTION

This invention relates to a thermoplastic elastomer composition comprising (A) at least one halogenated isobutylene-containing elastomer; and (B) at least one nylon resin having a melting point of about 170° C. to about 230° C.; wherein: (1) at least one halogenated isobutylene-containing elastomer is present as a dispersed phase of small vulcanized particles in a continuous phase of said nylon where the particles have been formed by dynamic vulcanization and the particles comprising greater than about 60 volume % of the volume of said elastomer and said resin.

In a particularly preferred embodiment the invention is also directed to a process conducted in a suitable mixer for producing a thermoplastic elastomer composition, said mixer having a characteristic residence time, said composition comprising greater than about 60 volume % of dispersed particles of a total amount of at least one halogenated isobutylene-containing elastomer, said particles dispersed in a continuous thermoplastic nylon resin matrix, said process comprising the steps of: (1) mixing halogenated elastomer-containing composition (A), said composition (A) comprising a first fraction of the total amount of halogenated elastomer in said thermoplastic elastomer composition and further comprising a cure system for said first elastomer fraction; and thermoplastic nylon resin (B) under suitable dynamic vulcanization conditions of time, temperature and shear to form composition (C); (2) mixing composition (C) and halogenated elastomer-containing composition (D), said composition (D) comprising a second fraction of the total amount of halogenated elastomer in said thermoplastic elastomer composition and further comprising a cure system for said second elastomer fraction; under suitable dynamic vulcanization conditions of time, temperature and shear to form composition (E); (3) if the sum of said first and second fractions of halogenated elastomer is less than the total amount of halogenated elastomer in said thermoplastic elastomer composition, mixing composition (E) and halogenated elastomer-containing composition (F), said composition (F) comprising a third fraction of the total amount of halogenated elastomer in said thermoplastic elastomer composition and further comprising a cure system for said third elastomer fraction; under suitable dynamic vulcanization conditions of time, temperature and shear to form composition (G); wherein the step of dynamically vulcanizing a fractional additional amount of halogenated elastomer in the presence of the dynamically vulcanized composition of the preceding step is repeated as many times as necessary in order to obtain the total amount of halogenated elastomer in said thermoplastic elastomer composition; and wherein each said dynamic vulcanization conditions at each step are sufficient to effect a cure state in said elastomer particles of at least about 50% of the maximum cure state for said elastomer and cure system and wherein said dynamic vulcanization time period is equal to or less than about the characteristic residence time of said mixer.

DETAILED DESCRIPTION

Figure 1:
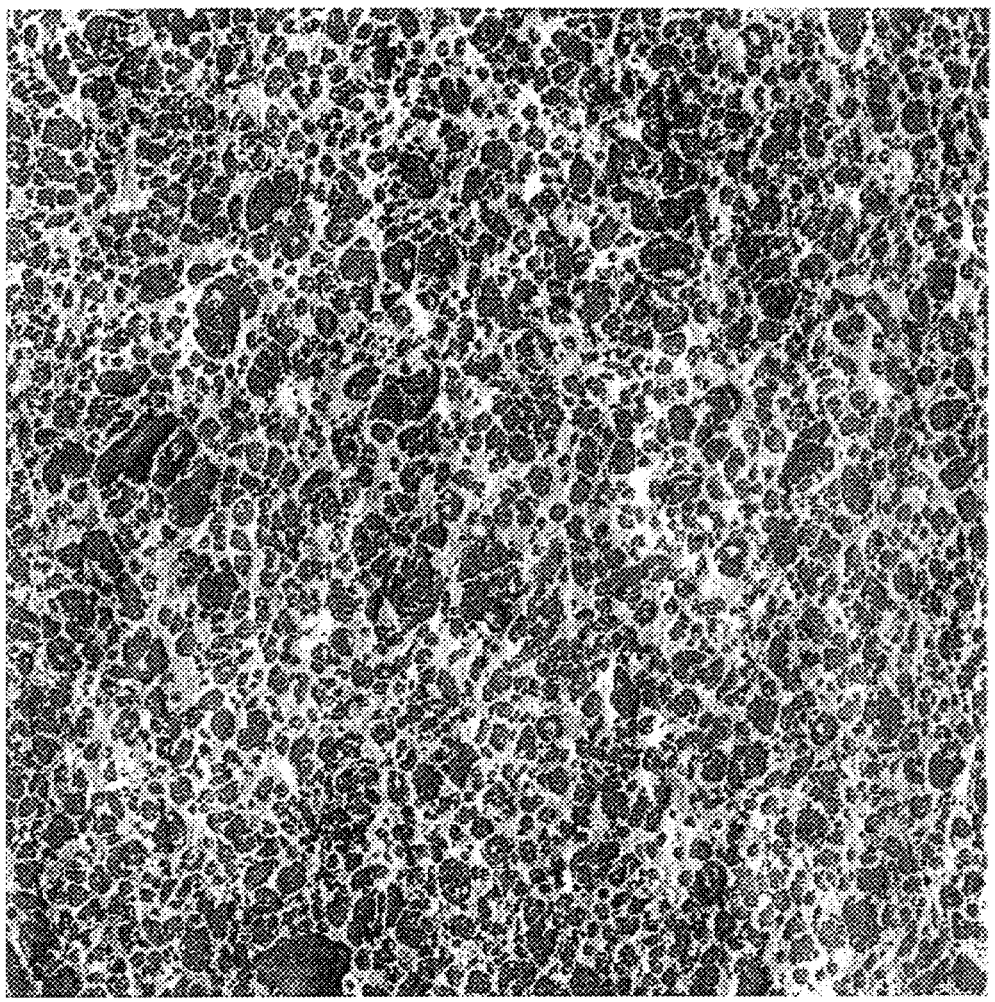
FIG. 1 is a view of the microstructure according the embodiment of Example 13, i.e., 20 microns×20 microns AFM image, wherein the light phase: Nylon and dark phase: BIMS.

Preferred applications of the present invention relate to thermoplastic elastomer compositions for tire innerliner and barrier films, more particularly to thermoplastic elastomer compositions exhibiting excellent durability and impermeability to fluids such as air as well as liquids. Preferred compositional features are directed to maximized content of dispersed halogenated isobutylene elastomers in the form of vulcanized particles dispersed in a polyamide thermoplastic matrix. Additionally, particularly preferred aspects of the invention relate to processes for producing a thermoplastic elastomer composition capable of providing a rubber domain comprising small sized particles while such domains are also highly extensible and elastic. Furthermore, the invention includes processes for producing pneumatic tires and hoses using the above compositions. The preferred elastomer exhibits low-permeability and is preferably a polymer such as halogenated isobutylene-containing elastomers and particularly preferred are brominated elastomers, especially brominated paramethylstyrene-co-isobutylene polymers (BIMS); preferred are bromobutyl elastomers exhibiting high content of the structure illustrated hereinafter below; and also preferred are commercial bromobutyl elastomers, or blends thereof with one or more of the aforementioned brominated elastomers with one another or with other polymers.

As used herein, the new numbering scheme for the Periodic Table Groups is used as disclosed in CHEMICAL AND ENGINEERING NEWS, 63(5), 27 (1985). All molecular weights are weight average unless otherwise noted.

Throughout the entire specification, including the claims, the word "comprise" and variations of the word, such as "comprising" and "comprises," as well as "have," "having," "includes," "include" and "including," and variations thereof, means that the named steps, elements or materials to which it refers are essential, but other steps, elements or materials may be added and still form a construct with the scope of the claim or disclosure. When recited in describing the invention and in a claim, it means that the invention and what is claimed is considered to what follows and potentially more. These terms, particularly when applied to claims, are inclusive or open-ended and do not exclude additional, unrecited elements or methods steps.

In the present context, "consisting essentially of" is meant to exclude any element or combination of elements, as well as any amount of any element or combination of elements, that would alter the basic and novel characteristics of the invention. Thus, by way of examples only, a thermoplastic composition that is prepared by a method other than one involving dynamic vulcanization or by use of a dynamic vulcanization method in which all of the rubber component is added in a single amount or in which high diene rubber or other polymer or polymer combination is used to the exclusion of halogenated isobutylene-containing rubber in such a composition, would be excluded. Alternatively, and again for exemplary purposes only, a thermoplastic composition in which the rubber cure system results in a cure time to achieve the necessary level of cure state in the rubber that is substantially greater than the residence time of the mixer used for conducting dynamic vulcanization would be excluded.

For purposes of the present invention, unless otherwise defined with respect to a specific property, characteristic or variable, the term "substantially" as applied to any criteria, such as a property, characteristic or variable, means to meet the stated criteria in such measure such that one skilled in the art would understand that the benefit to be achieved, or the condition or property value desired is met.

Polymer may be used to refer to homopolymers, copolymers, interpolymers, terpolymers, etc. Likewise, a copolymer may refer to a polymer comprising at least two monomers, optionally with other monomers.

When a polymer is referred to as comprising a monomer, the monomer is present in the polymer in the polymerized form of the monomer or in the derivative form the monomer. However, for ease of reference the phrase "comprising the (respective) monomer" or the like is used as shorthand. Likewise, when catalyst components are described as comprising neutral stable forms of the components, it is well understood by one skilled in the art, that the active form of the component is the form that reacts with the monomers to produce polymers.

Isoolefin refers to any olefin monomer having two substitutions on the same carbon.

Multiolefin refers to any monomer having two double bonds. In a preferred embodiment, the multiolefin is any monomer comprising two double bonds, preferably two conjugated double bonds such as a conjugated diene like isoprene.

Elastomer or elastomers as used herein, refers to any polymer or composition of polymers consistent with the ASTM D1566 definition. The terms may be used interchangeably with the term "rubber(s)."

Alkyl refers to a paraffinic hydrocarbon group which may be derived from an alkane by dropping one or more hydrogens from the formula, such as, for example, a methyl group ($CH_3$), or an ethyl group ($CH_3CH_2$), etc.

Aryl refers to a hydrocarbon group that forms a ring structure characteristic of aromatic compounds such as, for example, benzene, naphthalene, phenanthrene, anthracene, etc., and typically possess alternate double bonding ("unsaturation") within its structure. An aryl group is thus a group derived from an aromatic compound by dropping one or more hydrogens from the formula such as, for example, phenyl, or $C_6H_5$.

Substituted refers to at least one hydrogen group being replaced by at least one substituent selected from, for example, halogen (chlorine, bromine, fluorine, or iodine), amino, nitro, sulfoxy (sulfonate or alkyl sulfonate), thiol, alkylthiol, and hydroxy; alkyl, straight or branched chain having 1 to 20 carbon atoms which includes methyl, ethyl, propyl, tert-butyl, isopropyl, isobutyl, etc.; alkoxy, straight or branched chain alkoxy having 1 to 20 carbon atoms, and includes, for example, methoxy, ethoxy, propoxy, isopropoxy, butoxy, isobutoxy, secondary butoxy, tertiary butoxy, pentyloxy, isopentyloxy, hexyloxy, heptyloxy, octyloxy, nonyloxy, and decyloxy; haloalkyl, which means straight or branched chain alkyl having 1 to 20 carbon atoms which contains at least one halogen, and includes, for example, chloromethyl, bromomethyl, fluoromethyl, iodomethyl, 2-chloroethyl, 2-bromoethyl, 2-fluoroethyl, 3-chloropropyl, 3-bromopropyl, 3-fluoropropyl, 4-chlorobutyl, 4-fluorobutyl, dichloromethyl, dibromomethyl, difluoromethyl, diiodomethyl, 2,2-dichloroethyl, 2,2-dibromomethyl, 2,2-difluoroethyl, 3,3-dichloropropyl, 3,3-difluoropropyl, 4,4-dichlorobutyl, 4,4-difluorobutyl, trichloromethyl, 4,4-difluorobutyl, trichloromethyl, trifluoromethyl, 2,2,2-trifluoroethyl, 2,3,3-trifluoropropyl, 1,1,2,2-tetrafluoroethyl, and 2,2,3,3-tetrafluoropropyl. Thus, for example, a "substituted styrenic unit" includes p-methylstyrene, p-ethylstyrene, etc.

The present invention comprises at least one halogenated isobutylene-containing rubber. Typically, it is present in a composition with a thermoplastic engineering resin (preferably nylon) as described herein, in a volume ratio of rubber to resin of about 50/45 to 80/20; preferably about 60/40 to about 75/25; more preferably about 65/35 to about 75/25. Halogenated rubber is defined as a rubber having at least about 0.1 mole % halogen, such halogen selected from the group consisting of bromine, chlorine and iodine. Preferred halogenated rubbers useful in this invention include halogenated isobutylene containing elastomers (also referred to as halogenated isobutylene-based homopolymers or copolymers) These elastomers can be described as random copolymer of a $C_4$ to $C_7$ isomonoolefin derived unit, such as isobutylene derived unit, and at least one other polymerizable unit. In one embodiment of the invention, the halogenated isobutylene-based copolymer is a butyl-type rubber or branched butyl-type rubber, especially brominated versions of these elastomers. (Useful unsaturated butyl rubbers such as homopolymers and copolymers of olefins or isoolefins and other types of elastomers suitable for the invention are well known and are described in RUBBER TECHNOLOGY 209-581 (Maurice Morton ed., Chapman & Hall 1995), THE VANDERBILT RUBBER HANDBOOK 105-122 (Robert F. Ohm ed., R.T. Vanderbilt Co., Inc. 1990), and Edward Kresge and H. C. Wang in 8 KIRK-OTHMER ENCYCLOPEDIA OF CHEMICAL TECHNOLOGY 934-955 (John Wiley & Sons, Inc. 4th ed. 1993)).

Butyl rubbers are typically prepared by reacting a mixture of monomers, the mixture having at least (1) a $C_4$ to $C_{12}$ isoolefin monomer component such as isobutylene with (2) a multiolefin, monomer component. The isoolefin is in a range from 70 to 99.5 wt % by weight of the total monomer mixture in one embodiment, and 85 to 99.5 wt % in another embodiment. The multiolefin component is present in the monomer mixture from 30 to 0.5 wt % in one embodiment, and from 15 to 0.5 wt % in another embodiment. In yet another embodiment, from 8 to 0.5 wt % of the monomer mixture is multiolefin. The isoolefin is preferably a $C_4$ to $C_{12}$ compound, non-limiting examples of which are compounds such as isobutylene, isobutene, 2-methyl-1-butene, 3-methyl-1-butene, 2-methyl-2-butene, 1-butene, 2-butene, methyl vinyl ether, indene, vinyltrimethylsilane, hexene, and 4-methyl-1-pentene. The multiolefin is a $C_4$ to $C_{14}$ multiolefin such as isoprene, butadiene, 2,3-dimethyl-1,3-butadiene, myrcene, 6,6-dimethyl-fulvene, hexadiene, cyclopentadiene, and piperylene, and other monomers such as disclosed in EP 0 279 456 and U.S. Pat. Nos. 5,506,316 and 5,162,425. Other polymerizable monomers such as styrene and dichlorostyrene are also suitable for homopolymerization or copolymerization in butyl rubbers. One embodiment of the butyl rubber polymer useful in the invention is obtained by reacting 95 to 99.5 wt % of isobutylene with 0.5 to 8 wt % isoprene, or from 0.5 wt % to 5.0 wt % isoprene in yet another embodiment. Butyl rubbers and methods of their production are described in detail in, for example, U.S. Pat. Nos. 2,356,128, 3,968,076, 4,474, 924, 4,068,051 and 5,532,312.

Halogenated butyl rubber is produced by the halogenation of the butyl rubber product described above. Halogenation can be carried out by any means, and the invention is not herein limited by the halogenation process. Methods of halogenating polymers such as butyl polymers are disclosed in U.S. Pat. Nos. 2,631,984, 3,099,644, 4,288,575, 4,554,326, 4,632,963, 4,681,921, 4,650,831, 4,384,072, 4,513,116 and 5,681,901. In one embodiment, the butyl rubber is halogenated in hexane diluent at from 4 to 60 (C using bromine ($Br_2$) or chlorine ($Cl_2$) as the halogenation agent. Post-treated halogenated butyl rubber can also be used, as disclosed in U.S. Pat. No. 4,288,575. Useful halogenated butyl rubber typically has a Mooney Viscosity of about 20 to about 70 (ML 1+8 at 125 (C); for example, and about 25 to about 55 in another embodiment. The preferred halogen content is typically about 0.1 to 10 wt % based on the weight of the halogenated rubber; for example, about 0.5 to 5 wt %; alternatively, about 0.8 to about 2.5 wt %; for example, about 1 to about 2 wt %. A particularly preferred form of halogenated butyl rubber contains a high content of the following halogenated structure (preferably 60 to 95% as measured by NMR) where X represents the halogen and, in a particularly preferred embodiment, the halogen is bromine; alternatively the halogen is chlorine:

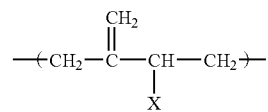

A commercial embodiment of a halogenated butyl rubber useful in the present invention is Bromobutyl 2222 (ExxonMobil Chemical Company). Its Mooney Viscosity is typically about 27 to 37 (ML 1+8 at 125 (C, ASTM 1646, modified), and its bromine content is about 1.8 to 2.2 wt % relative to the Bromobutyl 2222. Furthermore, the cure characteristics of Bromobutyl 2222 as provided by the manufacturer are as follows: MH about 28 to 40 dN m, ML is about 7 to 18 dN m (ASTM D2084). Another commercial embodiment of the halogenated butyl rubber useful in the present invention is Bromobutyl 2255 (ExxonMobil Chemical Company). Its Mooney Viscosity is about 41 to 51 (ML 1+8 at 125 (C, ASTM D1646), and its bromine content is about 1.8 to 2.2 wt %. Furthermore, its cure characteristics as disclosed by the manufacturer are as follows: MH is from 34 to 48 dN m, ML is from 11 to 21 dN m (ASTM D2084). Commercial isobutylene polymers are described in detail by R. N. Webb, T. D. Shaffer and A. H. Tsou, "Commercial Isobutylene Polymers," Encyclopedia of Polymer Science and Technology, 2002, John Wiley & Sons, incorporated herein by reference.

Another useful embodiment of halogenated butyl rubber is halogenated, branched or "star-branched" butyl rubber. These rubbers are described in, for example, EP 0 678 529 B1, U.S. Pat. Nos. 5,182,333 and 5,071,913, each incorporated herein by reference. In one embodiment, the star-branched butyl rubber ("SBB") is a composition comprising butyl rubber and a polydiene or block copolymer. For purposes of the present invention, the method of forming the SBB is not a limitation. The polydienes, block copolymer, or branching agents (hereinafter "polydienes"), are typically cationically reactive and are present during the polymerization of the butyl or halogenated butyl rubber, or can be blended with the butyl rubber to form the SBB. The branching agent or polydiene can be any suitable branching agent, and the invention is not limited to the type of polydiene or branching agent used to make the SBB.

In one embodiment, the SBB is a composition of butyl or halogenated butyl rubber as described above and a copolymer of a polydiene and a partially hydrogenated polydiene selected from the group consisting of styrene, polybutadiene, polyisoprene, polypiperylene, natural rubber, styrene-butadiene rubber, ethylene-propylene diene rubber (EPDM), ethylene-propylene rubber (EPM), styrene-butadiene-styrene and styrene-isoprene-styrene block copolymers. Polydienes can be present, based on the total monomer content in wt %, typically greater than 0.3 wt %; alternatively, about 0.3 to about 3 wt %; or about 0.4 to 2.7 wt %.

Preferably the branched or "star-branched" butyl rubber used herein is halogenated. In one embodiment, the halogenated star-branched butyl rubber ("HSBB") comprises a butyl rubber, either halogenated or not, and a polydiene or block copolymer, either halogenated or not. The halogenation process is described in detail in U.S. Pat. No. 4,074,035, U.S. Pat. No. 5,071,913, U.S. Pat. No. 5,286,804, U.S. Pat. No. 5,182,333 and U.S. Pat. No. 6,228,978. The present invention is not limited by the method of forming the HSBB. The polydiene/block copolymer, or branching agents (hereinafter "polydienes"), are typically cationically reactive and are present during the polymerization of the butyl or halogenated butyl rubber, or can be blended with the butyl or halogenated butyl rubber to form the HSBB. The branching agent or polydiene can be any suitable branching agent, and the invention is not limited by the type of polydiene used to make the HSBB.

In one embodiment, the HSBB is typically a composition comprising halogenated butyl rubber as described above and a copolymer of a polydiene and a partially hydrogenated polydiene selected from the group consisting of styrene, polybutadiene, polyisoprene, polypiperylene, natural rubber, styrene-butadiene rubber, ethylene-propylene diene rubber, styrene-butadiene-styrene and styrene-isoprene-styrene block copolymers. Polydienes can be present, based on the total monomer content in wt %, typically greater than about 0.3 wt %, alternatively about 0.3 to 3 wt %, or about 0.4 to 2.7 wt %.

A commercial embodiment of HSBB useful in the present invention is Bromobutyl 6222 (ExxonMobil Chemical Company), having a Mooney Viscosity (ML 1+8 at 125° C., ASTM D1646) of about 27 to 37, and a bromine content of about 2.2 to 2.6 wt %. Further, cure characteristics of Bromobutyl 6222, as disclosed by the manufacturer, are as follows: MH is from 24 to 38 dN·m, ML is from 6 to 16 dN·m (ASTM D2084).

Preferred isoolefin/para-alkylstyrene copolymers useful herein include random copolymers comprising a $C_4$ to $C_7$ isoolefin, such as isobutylene, and a halomethylstyrene. The halomethylstyrene may be an ortho-, meta-, or para-alkyl-substituted styrene. In one embodiment, the halomethylstyrene is a p-halomethylstyrene containing at least 80%, more preferably at least 90% by weight of the para-isomer. The "halo" group can be any halogen, desirably chlorine or bromine. The copolymer may also include functionalized interpolymers wherein at least some of the alkyl substituent groups present on the styrene monomer units contain benzylic halogen or another functional group described further below. These interpolymers are herein referred to as "isoolefin copolymers comprising a halomethylstyrene" or simply "isoolefin copolymer."

Preferred isoolefin copolymers can include monomers selected from the group consisting of isobutylene or isobutene, 2-methyl-1-butene, 3-methyl-1-butene, 2 methyl-2-butene, 1-butene, 2-butene, methyl vinyl ether, indene, vinyltrimethylsilane, hexene, and 4-methyl-1-pentene. Preferred isoolefin copolymers may also further comprise multiolefins, preferably a $C_4$ to $C_{14}$ multiolefin such as isoprene, butadiene, 2,3-dimethyl-1,3-butadiene, myrcene, 6,6-dimethyl-fulvene, hexadiene, cyclopentadiene, and piperylene, and other monomers such as disclosed in EP 279456 and U.S. Pat. No. 5,506,316 and U.S. Pat. No. 5,162,425. Desirable styrenic monomers in the isoolefin copolymer include styrene, methylstyrene, chlorostyrene, methoxystyrene, indene and indene derivatives, and combinations thereof.

Preferred isoolefin copolymers may be characterized as interpolymers containing the following monomer units randomly spaced along the polymer chain:

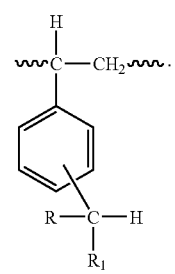

1

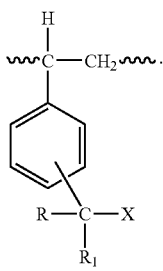

2 wherein R and $R^1$ are independently hydrogen, lower alkyl, preferably $C_1$ to $C_7$ alkyl and primary or secondary alkyl halides and X is a functional group such as halogen. Desirable halogens are chlorine, bromine or combinations thereof, preferably bromine. Preferably R and $R^1$ are each hydrogen. The —$CRR_1H$ and —$CRR_1X$ groups can be substituted on the styrene ring in either the ortho, meta, or para positions, preferably the para position. Up to 60 mole % of the p-substituted styrene present in the interpolymer structure may be the functionalized structure (2) above in one embodiment, and in another embodiment from 0.1 to 5 mol %. In yet another embodiment, the amount of functionalized structure (2) is from 0.4 to 1 mol %. The functional group X may be halogen or some other functional group which may be incorporated by nucleophilic substitution of benzylic halogen with other groups such as carboxylic acids; carboxy salts; carboxy esters, amides and imides; hydroxy; alkoxide; phenoxide; thiolate; thioether; xanthate; cyanide; cyanate; amino and mixtures thereof. These functionalized isomonoolefin copolymers, their method of preparation, methods of functionalization and cure are more particularly disclosed in U.S. Pat. No. 5,162,445.

Particularly useful of such copolymers of isobutylene and p-methylstyrene are those containing from 0.5 to 20 mole % p-methylstyrene wherein up to 60 mole % of the methyl substituent groups present on the benzyl ring contain a bromine or chlorine atom, preferably a bromine atom (p-bromomethylstyrene), as well as acid or ester functionalized versions thereof wherein the halogen atom has been displaced by maleic anhydride or by acrylic or methacrylic acid functionality. These interpolymers are termed "halogenated poly (isobutylene-co-p-methylstyrene)" or "brominated poly (isobutylene-co-p-methylstyrene)", and are commercially available under the name EXXPRO™ Elastomers (Exxon-Mobil Chemical Company, Houston Tex.). It is understood that the use of the terms "halogenated" or "brominated" are not limited to the method of halogenation of the copolymer, but merely descriptive of the copolymer which comprises the isobutylene derived units, the p-methylstyrene derived units, and the p-halomethylstyrene derived units.

These functionalized polymers preferably have a substantially homogeneous compositional distribution such that at least 95% by weight of the polymer has a p-alkylstyrene content within 10% of the average p-alkylstyrene content of the polymer as measured by gel permeation chromatography (as shown in U.S. Pat. No. 5,162,445). More preferred polymers are also characterized by a narrow molecular weight distribution (Mw/Mn) of less than 5, more preferably less than 2.5, a preferred viscosity average molecular weight in the range of about 200,000 to about 2,000,000 and a preferred number average molecular weight in the range of about 25,000 to about 750,000 as determined by gel permeation chromatography.

Preferred halogenated poly(isobutylene-co-p-methylstyrene) polymers are brominated polymers which generally contain from about 0.1 to about 5 wt % of bromomethyl groups. In yet another embodiment, the amount of bromomethyl groups is about 0.2 to about 2.5 wt %. Expressed another way, preferred copolymers contain about 0.05 to about 2.5 mole % of bromine, based on the weight of the polymer, more preferably about 0.1 to about 1.25 mole % bromine, and are substantially free of ring halogen or halogen in the polymer backbone chain. In one embodiment of the invention, the interpolymer is a copolymer of $C_4$ to $C_7$ isomonoolefin derived units, p-methylstyrene derived units and p-halomethylstyrene derived units, wherein the p-halomethylstyrene units are present in the interpolymer from about 0.4 to about 1 mol % based on the interpolymer. In another embodiment, the p-halomethylstyrene is p-bromomethylstyrene. The Mooney Viscosity (1+8, 125° C., ASTM D1646) is about 30 to about 60 Mooney units.

In another embodiment, the relationship between the triad fraction of an isoolefin and a p-alkylstyrene and the mol % of p-alkylstyrene incorporated into the copolymer is described by the copolymer sequence distribution equation described below and is characterized by the copolymer sequence distribution parameter, m.

$$F=1-\{mA/(1+mA)\}$$

where: m is the copolymer sequence distribution parameter,
A is the molar ratio of p-alkylstyrene to isoolefin in the copolymer and,
F is the p-alkylstyrene-isoolefin-p-alkylstyrene triad fraction in the copolymer.

The best fit of this equation yields the value of m for copolymerization of the isoolefin and p-alkylstyrene in a particular diluent. In certain embodiments, m is from less than 38; alternatively, from less than 36; alternatively, from less than 35; and alternatively, from less than 30. In other embodiments, m is from 1-38; alternatively, from 1-36; alternatively, from 1-35; and alternatively from 1-30. Copolymers having such characteristics are disclosed in WO 2004058825 and WO 2004058835.

In another embodiment, the isoolefin/para-alkylstyrene copolymer is substantially free of long chain branching. For the purposes of this invention, a polymer that is substantially free of long chain branching is defined to be a polymer for which $g'_{vis.avg.}$ is determined to be greater than or equal to 0.978, alternatively, greater than or equal to 0.980, alternatively, greater than or equal to 0.985, alternatively, greater than or equal to 0.990, alternatively, greater than or equal to 0.995, alternatively, greater than or equal to 0.998, alternatively, greater than or equal to 0.999, as determined by triple detection size exclusion chromatography (SEC) as described below. Such polymers are also disclosed in WO 2004058825 and WO 2004058835.

In another embodiment, the relationship between the triad fraction of an isoolefin and a multiolefin and the mol % of multiolefin incorporated into the halogenated rubber copolymer is described by the copolymer sequence distribution equation below and is characterized by the copolymer sequence distribution parameter, m.

$$F=mA/(1+mA)^2$$

where: m is the copolymer sequence distribution parameter,
A is the molar ratio of multiolefin to isoolefin in the copolymer and,
F is the isoolefin-multiolefin-multiolefin triad fraction in the copolymer.

Measurement of triad fraction of an isoolefin and a multiolefin and the mol % of multiolefin incorporated into the copolymer is described below. The best fit of this equation yields the value of m for copolymerization of the isoolefin and multiolefin in each diluent. In certain embodiments, m is from greater than 1.5; alternatively, from greater than 2.0; alternatively, from greater than 2.5; alternatively, from greater than 3.0; and alternatively, from greater than 3.5. In other embodiments, m is from 1.10 to 1.25; alternatively, from 1.15 to 1.20; alternatively, from 1.15 to 1.25; and alternatively, m is about 1.20. Halogenated rubbers that have these characteristics are disclosed in WO 2004058825 and WO 2004058835.

In another embodiment, the halogenated rubber is substantially free of long chain branching. For the purposes of this invention, a polymer that is substantially free of long chain branching is defined to be a polymer for which $g'_{vis.avg.}$ is determined to be greater than or equal to 0.978, alternatively, greater than or equal to 0.980, alternatively, greater than or equal to 0.985, alternatively, greater than or equal to 0.990, alternatively, greater than or equal to 0.995, alternatively, greater than or equal to 0.998, alternatively, greater than or equal to 0.999, as determined by triple detection SEC as follows. The presence or absence of long chain branching in the polymers is determined using triple detection SEC. Triple detection SEC is performed on a Waters (Milford, Mass.) 150 C chromatograph operated at 40° C. equipped a Precision Detectors (Bellingham, Mass.) PD2040 light scattering detector, a Viscotek (Houston, Tex.) Model 150R viscometry detector and a Waters differential refractive index detector (integral with the 150 C). The detectors are connected in series with the light scattering detector being first, the viscometry detector second and the differential refractive index detector third. Tetrahydrofuran is used as the eluent (0.5 ml/min.) with a set of three Polymer Laboratories, Ltd. (Shropshire, United Kingdom) 10 micron mixed-B/LS GPC columns. The instrument is calibrated against 16 narrow polystyrene standards (Polymer Laboratories, Ltd.). Data is acquired with TriSEC software (Viscotek) and imported into WaveMetric's Igor Pro program (Lake Oswego, Oreg.) for analysis. Linear polyisobutylene is used to establish the relationship between the intrinsic viscosity $[\eta]_{linear}$ determined by the viscometry detector) and the molecular weight ($M_w$, determined by the light scattering detector). The relationship between $[\eta]_{linear}$ and $M_w$ is expressed by the Mark-Houwink equation.

$$[\eta]_{linear} = KM_w^\alpha$$

Parameters K and α are obtained from the double-logarithmic plot of intrinsic viscosity against $M_w$, α is the slope, K the intercept. Significant deviations from the relationship established for the linear standards indicate the presence of long chain branching. Generally, samples which exhibit more significant deviation from the linear relationship contain more significant long chain branching. The scaling factor g' also indicates deviations from the determined linear relationship.

$$[\eta]_{sample} = g'[\eta]_{linear}$$

The value of g' is defined to be less than or equal to one and greater than or equal to zero. When g' is equal or nearly equal to one, the polymer is considered to be linear. When g' is significantly less than one, the sample is long chain branched. See e.g. E. F. Casassa and G. C. Berry in "Comprehensive Polymer Science," Vol. 2, (71-120) G. Allen and J. C. Bevington, Ed., Pergamon Press, New York, 1988. In triple detection SEC, a g' is calculated for each data slice of the chromatographic curve. A viscosity average g' or $g'_{vis.avg.}$ is calculated across the entire molecular weight distribution.

The scaling factor $g'_{vis.avg.}$ is calculated from the average intrinsic viscosity of the sample:

$$g'_{vis.avg.} = [\eta]_{avg.}/(KM_w^\alpha))$$

Other preferred halogenated elastomers or rubbers include halogenated isobutylene-p-methylstyrene-isoprene copolymer as described in WO 01/21672A1.

The isobutylene-containing elastomers used in the thermoplastic elastomer compositions useful as fluid permeation prevention layer as described herein may be the same or different as halogen containing elastomers present in other layers of the article being manufactured. For example if the fluid permeation layer is present as a tire innerlayer, then the other layers of the tire, particularly those in contact with the innerlayer may also contain the same isobutylene-containing elastomers. Likewise, the halogenated isobutylene containing elastomer useful in the air permeation prevention layer and the elastomer useful in a tie layer, adhesive layer, and/or carcass may be the same or different elastomer. In a preferred embodiment, the halogenated isobutylene containing elastomer present in the air permeation prevention layer and the elastomer present in the tie layer, adhesive layer, and/or carcass are the same elastomer. In another embodiment, they are different. By same is meant that the elastomers have comonomer and halogen content within 2 weight % of each other, respectively. By different is meant that the elastomers comprise different halogens or comonomers or that the elastomers have comonomer or halogen contents that are not within 2 weight % of each other. For example a BIMS copolymer having 3 weight % para-methyl styrene (PMS) and 5 weight % bromine is considered different from a BIMS copolymer having 11 weight % PMS and 5 weight % bromine. In a preferred embodiment, the elastomer present in the air permeation prevention layer is a brominated copolymer of isobutylene and para-methyl styrene and the halogenated isobutylene containing elastomer present in the tie layer, adhesive layer, and/or carcass is the same or a different brominated copolymer of isobutylene and para-methyl styrene. In another embodiment, the elastomer present in the air permeation prevention layer is a brominated copolymer of isobutylene and para-methyl styrene and the halogenated isobutylene containing elastomer present in the tie layer, adhesive layer, and/or carcass is a brominated butyl rubber.

Useful DVA compositions described herein also comprise a thermoplastic or engineering resin (such as nylon) in addition to the elastomer.

For purposes of the present invention, an engineering resin (also called an "engineering thermoplastic resin," a "thermoplastic resin," or a "thermoplastic engineering resin") is defined to be any thermoplastic polymer, copolymer or mixture thereof having a Young's modulus of more than 500 MPa and, preferably, an air permeation coefficient of less than $60 \times 10^{-12}$ cc cm/cm² sec cm Hg (at 30° C.), and, preferably, a melting point of about 170° C. to about 230° C., including, but not limited to, one or more of the following:

a) polyamide resins: nylon 6 (N6), nylon 66 (N66), nylon 46 (N46), nylon 11 (N11), nylon 12 (N12), nylon 610 (N610), nylon 612 (N612), nylon 6/66 copolymer (N6/66), nylon 6/66/610 (N6/66/610), nylon MXD6 (MXD6), nylon 6T (N6T), nylon 6/6T copolymer, nylon 66/PP copolymer, nylon 66/PPS copolymer;

b) polyester resins: polybutylene terephthalate (PBT), polyethylene terephthalate (PET), polyethylene isophthalate (PEI), PET/PEI copolymer, polyacrylate (PAR), polybutylene naphthalate (PBN), liquid crystal polyester, polyoxalkylene diimide diacid/polybutyrate terephthalate copolymer and other aromatic polyesters;

c) polynitrile resins: polyacrylonitrile (PAN), polymethacrylonitrile, acrylonitrile-styrene copolymers (AS), methacrylonitrile-styrene copolymers, methacrylonitrile-styrene-butadiene copolymers;
d) polymethacrylate resins: polymethyl methacrylate, polyethylacrylate;
e) polyvinyl resins (for illustration, not limitation: vinyl acetate (EVA), polyvinyl alcohol (PVA), vinyl alcohol/ethylene copolymer (EVOA), polyvinylidene chloride (PVDC), polyvinyl chloride (PVC), polyvinyl/polyvinylidene copolymer, polyvinylidene chloride/methacrylate copolymer;
f) cellulose resins: cellulose acetate, cellulose acetate butyrate;
g) fluorine resins: polyvinylidene fluoride (PVDF), polyvinyl fluoride (PVF), polychlorofluoroethylene (PCTFE), tetrafluoroethylene/ethylene copolymer (ETFE);
h) polyimide resins: aromatic polyimides);
i) polysulfones;
j) polyacetals;
k) polyactones;
l) polyphenylene oxide and polyphenylene sulfide;
m) styrene-maleic anhydride;
n) aromatic polyketones; and
o) mixtures of any and all of a) through n) inclusive as well as mixtures of any of the illustrative or exemplified engineering resins within each of a) through n) inclusive.

For purposes of the present invention, this definition of engineering resin excludes polymers of olefins, such as polyethylene and polypropylene.

Preferred engineering resins include polyamide resins and mixtures thereof; particularly preferred resins include Nylon 6, Nylon 6/66 copolymer, Nylon 11, Nylon 12, Nylon 610, Nylon 612 and their blends. According to an alternative preferred embodiment of the present invention, the thermoplastic elastomer composition may be formulated using a thermoplastic resin component where the nylon resin component is comprises nylon 11 or nylon 12, and nylon 6/66 copolymer in a ratio of composition (ratio by weight) of about 10/90 to about 90/10; preferably about 30/70 to about 85/15. Such a thermoplastic elastomer composition based on blended resins can provide a thermoplastic elastomer composition having superior durability and appearance, e.g., of the cured surface of a tire innerliner as well as superior air retention properties, as well as demonstrating a good balance of these properties.

Optionally, other rubbers or elastomers can be used in combination with the halogenated isobutylene-containing elastomer. Such an optional rubber component includes high diene rubbers and their hydrates. High diene content rubbers or elastomers are also referred to as high diene monomer rubber. It is typically a rubber comprising typically at least 50 mole % of a $C_4$-$C_{12}$ diene monomer, typically at least about 60 mole % to about 100 mole %; more preferably at least about 70 mole % to about 100 mole %; more preferably at least about 80 mole % to about 100 mole %. Useful high diene monomer rubbers include homopolymers and copolymers of olefins or isoolefins and multiolefins, or homopolymers of multiolefins. These are well known and are described in RUBBER TECHNOLOGY, 179-374 (Maurice Morton ed., Chapman & Hall 1995), and THE VANDERBILT RUBBER HANDBOOK 22-80 (Robert F. Ohm ed., R.T. Vanderbilt Co., Inc. 1990). Generally, other optional rubbers useful in the present invention include, for example natural rubber (NR), isoprene rubber (IR), epoxylated natural rubber, styrene butadiene rubber (SBR), polybutadiene rubber (BR) (including high cis BR and low cis BR), nitrile butadiene rubber (NBR), hydrogenated NBR, hydrogenated SBR olefin rubbers (for example, ethylene propylene rubbers (including both EPDM and EPM), maleic acid-modified ethylene propylene rubbers (M-EPM), butyl rubber (IIR), isobutylene and aromatic vinyl or diene monomer copolymers, acrylic rubbers (ACM), ionomers, other halogen-containing rubbers (for example, chloroprene rubbers (CR), hydrin rubbers (CHR), chlorosulfonated polyethylenes (CSM), chlorinated polyethylenes (CM), maleic acid-modified chlorinated polyethylenes (M-CM)), silicone rubbers (for example, methylvinyl silicone rubbers, dimethyl silicone rubbers, methylphenylvinyl silicone rubbers), sulfur-containing rubbers (for example, polysulfide rubbers), fluoro rubbers (for example, vinylidene fluoride rubbers, fluorine-containing vinyl ether-based rubbers, tetrafluoroethylene-propylene rubbers, fluorine-containing silicone rubbers, fluorine-containing phosphagen rubbers), thermoplastic elastomers (for example, styrene-containing elastomers, olefin elastomers, ester elastomers, urethane elastomers, or polyamide elastomers), and their mixtures.

Preferred examples of high diene monomer rubbers include polyisoprene, polybutadiene rubber, styrene-butadiene rubber, natural rubber, chloroprene rubber, acrylonitrile-butadiene rubber and the like, which may be used alone or in combination and mixtures.

Since the thermoplastic engineering resin and the halogenated isobutylene-containing rubber differ significantly in solubility, a further optional compatibilizing ingredient may be useful for the purposes of enhancing compatibility of these polymers. Such compatibilizers include ethylenically unsaturated nitrile-conjugated diene-based high saturation copolymer rubbers (HNBR), epoxylated natural rubbers (ENR), NBR, hydrin rubbers, acryl rubbers and mixtures thereof. Compatibilizers are thought to function by modifying, in particular reducing, the surface tension between the rubber and resin components. Other compatibilizers include copolymers such as those having the structure of both or one of the thermoplastic resin and rubber polymer or a structure of a copolymer having an epoxy group, carbonyl group, halogen group, amine group, maleated group, oxazoline group, hydroxy group, etc. capable of reacting with the thermoplastic resin or rubber polymer. These may be selected based upon the type of the thermoplastic resin polymer and rubber polymer to be mixed, but useful copolymers typically include, e.g., a styrene/ethylene-butylene/styrene block copolymer (SEBS) and its maleic acid-modified form; EPDM, EPDM/styrene, or EPDM/acrylonitrile graft copolymer and their maleic acid-modified forms; styrene/maleic acid copolymer; reactive phenoxy thermoplastic resin; and their mixtures. The amount of the compatibilizer blended is not particularly limited, but, when used, typically is about 0.5 to about 10 parts by weight, based upon 100 parts by weight of the polymer component, in other words, the total of the thermoplastic engineering resin polymer and rubber polymer.

With reference to the polymers and/or elastomers referred to herein, the terms "cured," "vulcanized," or "crosslinked" refer to the chemical reaction comprising forming bonds as, for example, during chain extension, or crosslinks between polymer chains comprising the polymer or elastomer to the extent that the elastomer undergoing such a process can provide the necessary functional properties resulting from the curing reaction when the tire is put to use. For purposes of the present invention, absolute completion of such curing reactions is not required for the elastomer-containing composition to be considered "cured," "vulcanized" or "crosslinked." For example, for purposes of the present invention, a tire comprising an innerliner layer composition based on the present invention is sufficiently cured when the tire of which it is a component passes the necessary product specification tests during and after manufacturing and performs satisfactorily when used on a vehicle. Furthermore, the composition is satisfactorily, sufficiently or substantially cured, vulcanized or crosslinked when the tire can be put to use even if additional curing time could produce additional crosslinks.

Generally, polymer compositions, e.g., those used to produce tires, are crosslinked in the finished tire product. Crosslinking or vulcanization is accomplished by incorporation of curing agents and/or accelerators; the overall mixture of such agents being typically referred to as a cure "system." It is known that the physical properties, performance characteristics, and durability of vulcanized rubber compounds are directly related to the number (crosslink density) and types of crosslinks formed during the vulcanization reaction. (See, e.g., Helt et al., *The Post Vulcanization Stabilization for NR*, RUBBER WORLD 18-23 (1991). Curing agents include those components described above that facilitate or influence the cure of elastomers, and generally include metals, metal oxides, accelerators, sulfur, peroxides, and other agents common in the art, and as described above. Crosslinking or curing agents include at least one of, e.g., sulfur, zinc oxide, and fatty acids and mixtures thereof. Peroxide-containing cure systems may also be used. Generally, polymer compositions may be crosslinked by adding curative agents, for example sulfur, metal oxides (i.e., zinc oxide, ZnO), organometallic compounds, radical initiators, etc. and heating the composition or mixture.

When the method known as "dynamic vulcanization" is used, the process of dispersing the cure system is modified as described in detail hereinafter. Generally, the term "dynamic vulcanization" is used to denote a vulcanization process in which a thermoplastic or engineering resin and at least one vulcanizable rubber are mixed under conditions of high shear and elevated temperature in the presence of a curing agent or curing system for the rubber(s). As a result, the rubber is simultaneously crosslinked and dispersed as particles, preferably in the form of a microgel, within the resin which forms a continuous matrix. The resulting composition is known in the art as a "dynamically vulcanized alloy" or DVA. Typically, dynamic vulcanization is effected by mixing the ingredients at a temperature which is at or above the curing temperature of the rubber, and at or above the melting temperature of the thermoplastic resin, using equipment such as roll mills, Banbury® mixers, continuous mixers, kneaders, or mixing extruders (such as twin screw extruders). The unique characteristic of the dynamically vulcanized or cured composition is that, notwithstanding the fact that the rubber is cured the composition can be processed and reprocessed by conventional thermoplastic processing techniques such as extrusion, injection molding, compression molding, etc. Scrap and or flashing can also be salvaged and reprocessed. In a typical dynamic vulcanization process, curative addition is altered so as to substantially simultaneously mix and vulcanize, or crosslink, at least one of the vulcanizable components in a composition comprising at least one vulcanizable rubber, elastomer or polymer and at least one polymer or resin not vulcanizable using the vulcanizing agent(s) for the at least one vulcanizable component. (See, e.g., U.S. Pat. No. 6,079, 465 and the references cited therein.) However, in the present invention, the dynamic vulcanization process is further modified, as described below, in order to achieve the particular advantages resulting from such modification.

The following are common curatives that can function in the present invention: ZnO, CaO, MgO, $Al_2O_3$, $CrO_3$, FeO, $Fe_2O_3$, and NiO. These metal oxides can be used in conjunction with the corresponding metal stearate complex (e.g., the stearate salts of Zn, Ca, Mg, and Al), or with stearic acid, and either a sulfur compound or an alkylperoxide compound. (See also, *Formulation Design and Curing Characteristics of NBR Mixes for Seals*, RUBBER WORLD 25-30 (1993). To the curative agent(s) there are often added accelerators for the vulcanization of elastomer compositions. The curing agent(s), with or without the use of at least one accelerator, is often referred to in the art as a curing "system" for the elastomer(s). A cure system is used because typically more than one curing agent is employed for beneficial effects, particularly where a mixture of high diene rubber and a less reactive elastomer is used. Furthermore, because the present invention employs a specifically defined DVA process, it is necessary that the properties of the cure system are adapted to the mixing process so that the conditions of the invention can be met. In particular, the present DVA process utilizes the staged addition of the vulcanizable rubber component(s) wherein the rubber(s) to be dynamically vulcanized are added in at least two portions. Furthermore, it is necessary that all of the rubber added in a stage be cured before the rubber(s) in the next stage are added, such time period being characterized or measured by the mixer residence time. Typically the first, or if there are more than two stages of rubber addition, then in a preceding stage, rubber(s) are cured to a level of about 50% of the maximum cure which the particular rubber(s) and cure system are capable of reaching at the temperature of cure if measured independently of the dynamic vulcanization process in a time period that is less than about the mixer residence time. For example, in order to determine the cure response of the particular rubber(s) present in a composition, the rubber(s) and cure system can be combined by means known to those skilled in the art, e.g., on a two-roll mill, Banbury mixer or mixing extruder. A sample of the mixture, often referred to as the "accelerated" compound, can be cured under static conditions, such as in the form of a thin sheet using a mold that is subjected to heat and pressure in a press. Samples of the accelerated compound, cured as thin pads for progressively longer times and/or at higher temperatures, are then tested for stress strain properties and/or crosslink density to determine the state of cure (described in detail in American Society for Testing and Materials, Standard ASTM D412). Alternatively, the accelerated compound can be tested for state of cure using an oscillating disc cure rheometer test (described in detail in American Society for Testing and Materials, Standard ASTM D2084). Having established the maximum degree of cure, it is preferable to dynamically vulcanize the first or preceding stage rubber(s) added to the dynamically vulcanizable mixture to the extent that the degree of cure of such rubber(s) is selected from the group consisting of about 50%, for example, about 60% to greater than about 95%; about 65% to about 95%; about 70% to about 95%; about 75% to greater than about 90%; about 80% to about 98%; about 85% to about 95%; and about 85% to about 99% in a time period less than or substantially equivalent to about the residence time of the mixer used for dynamic vulcanization. Subsequent additions of rubber(s) to the dynamically vulcanizable mixture are similarly cured before further additions of rubber(s), if any. Consequently, at the conclusion of the dynamic vulcanization process, the vulcanizable rubbers added to the composition are sufficiently cured to achieve the desired properties of the thermoplastic composition of which they are a part, e.g., a fluid (air or liquid) retention barrier such as a innerliner for a tire. For purposes of the present invention, such state of cure can be referred to as "substantially fully cured."

It will be appreciated that the vulcanizable rubbers will be cured to at least 50% of the maximum state of cure of which they are capable based on the cure system, time and temperature, and typically, the state of cure of such rubbers will exceed 50% of maximum cure. If the cure state of the rubber(s) added in one stage are not cured to at least about 50% of their maximum, it is possible for dispersed rubber particles to coalesce into larger size particles, particularly during the mixing operations, which is undesirable. Conversely, it may be desirable to cure the rubber particles to less than the maximum state of cure of which the rubber is capable so that the flexibility, as measured, for example, by Young's modulus, of the rubber component is at a suitable level for the end-use to which the composition is to be put, e.g., a tire innerliner or hose component. Consequently, it may be desirable to control the state of cure of the rubber(s) used in the composition to be less than or equal to about 95% of the maximum degree of cure of which they are capable, as described above.

For purposes of dynamic vulcanization in the presence of an engineering resin to form, for example, a highly impermeable layer or film, any conventional curative system which is capable of vulcanizing saturated or unsaturated halogenated polymers may be used to vulcanize at least the elastomeric halogenated copolymer of a $C_4$ to $C_7$ isomonoolefin and a para-alkylstyrene, except that peroxide curatives are specifically excluded from the practice of this invention when there is present one or more thermoplastic engineering resins such that peroxide would cause such resins themselves to crosslink. In that circumstance, if the engineering resin would itself vulcanize or crosslink, it would result in an excessively cured, non-thermoplastic composition. Suitable curative systems for the elastomeric halogenated copolymer component of the present invention include zinc oxide in combination with zinc stearate or stearic acid and, optionally, one or more of the following accelerators or vulcanizing agents: Permalux (the di-ortho-tolylguanidine salt of dicatechol borate); HVA-2 (m-phenylene bis maleimide); Zisnet (2,4,6-trimercapto-5-triazine); ZDEDC (zinc diethyl dithiocarbamate) and also including for the purposes of the present invention, other dithiocarbamates; Tetrone A (dipentamethylene thiuram hexasulfide); Vultac 5 (alkylated phenol disulfide); SP1045 (phenol formaldehyde resin); SP1056 (brominated alkyl phenol formaldehyde resin); DPPD (diphenyl phenylene diamine); salicylic acid, ortho-hydroxy benzoic acid; wood rosin, abietic acid; and TMTDS (tetramethyl thiuram disulfide), used in combination with sulfur. However, in the present invention, since each addition of vulcanizable rubber(s) must be cured to at least 50% of its, or their, maximum state of cure under the temperature conditions of the process before the next addition of rubber(s), as measured by the residence time of the mixing device, it is also necessary to adjust the composition of the cure system to achieve such a suitable result. The methods by which this can be achieved are generally known to those skilled in this art and are further described in detail above, e.g., by use of the method set forth in ASTM D2084.

Curative accelerators include amines, guanidines, thioureas, thiazoles, thiurams, sulfenamides, sulfenimides, thiocarbamates, xanthates, and the like. Acceleration of the cure process may be accomplished by adding to the composition an amount of the accelerant. The mechanism for accelerated vulcanization of rubber involves complex interactions between the curative, accelerator, activators and polymers. Ideally all of the available curative is consumed in the formation of effective crosslinks which join individual polymer chains to one another and enhance the overall strength of the polymer matrix. Numerous accelerators are known in the art and include, but are not limited to, the following: stearic acid, diphenyl guanidine (DPG), tetramethylthiuram disulfide (TMTD), 4,4'-dithiodimorpholine (DTDM), tetrabutylthiuram disulfide (TBTD), 2,2'-benzothiazyl disulfide (MBTS), hexamethylene-1,6-bisthiosulfate disodium salt dihydrate, 2-(morpholinothio) benzothiazole (MBS or MOR), compositions of 90% MOR and 10% MBTS (MOR 90), N-tertiary-butyl-2-benzothiazole sulfenamide (TBBS), and N-oxydiethylene thiocarbamyl-N-oxydiethylene sulfonamide (OTOS), zinc 2-ethyl hexanoate (ZEH), N,N'-diethyl thiourea. Curatives, accelerators and the cure systems of which they are a part that are useful with one or more crosslinkable polymers are well-known in the art. The cure system can be dispersed in a suitable concentration into the desired portion of the rubber component, the rubber component optionally containing one or more filler, extender and/or plasticizer by, e.g., mixing the rubber and the cure system components in a step prior to addition of the rubber-containing composition to the thermoplastic using any mixing equipment commonly used in the rubber industry for such purpose, e.g., a two-roll rubber mill, a Banbury mixer, a mixing extruder and the like. Such mixing is commonly referred to as "accelerating" the rubber composition. Alternatively, the rubber composition can be accelerated in a stage of a mixing extruder prior to carrying out dynamic vulcanization. It is particularly preferred that the cure system be dispersed in the rubber phase, or in a rubber composition also optionally including one or more fillers, extenders and other common ingredients for the intended end-use application, prior to the addition of the rubber to the thermoplastic resin(s) in the mixing equipment in which it is intended to carry out dynamic vulcanization.

In one embodiment of the invention, at least one curing agent is typically present at about 0.1 to about 20 phr; alternatively at about 0.5 to about 10 phr.

Useful combinations of curatives, cure modifiers and accelerators can be illustrated as follows: As a general rubber vulcanization agent, e.g., a sulfur vulcanization agent, powdered sulfur, precipitated sulfur, high dispersion sulfur, surface-treated sulfur, insoluble sulfur, dimorpholinedisulfide, alkylphenoldisulfide, and mixtures thereof are useful. Such compounds may be used in an amount of about 0.5 phr to about 4 phr (parts by weight per 100 parts by weight of the elastomer component). Alternatively, where the use of such a material is feasible in view of other polymer and resin components present an organic peroxide vulcanization agent, benzoylperoxide, t-butylhydroperoxide, 2,4-dichlorobenzoylperoxide, 2,5-dimethyl-2,5-di(t-butylperoxy)hexane, 2,5-dimethylhexane-2,5-di(peroxylbenzoate), and mixtures thereof. When used, such curatives can be present at a level of about 1 phr to about 20 phr. Other useful curatives include phenol resin vulcanization agents such as a bromide of an alkylphenol resin or a mixed crosslinking agent system containing stannous chloride, chloroprene, or another halogen donor and an alkylphenol resin and mixtures thereof. Such agents can be used at a level of about 1 phr to about 20 phr. Alternatively, other useful curing agents, cure modifiers and useful levels include zinc oxide and/or zinc stearate (about 0.05 phr to about 5 phr), stearic acid (about 0.1 phr to about 5 phr), magnesium oxide (about 0.5 phr to about 4 phr), lyserge (10 to 20 phr or so), p-quinonedioxime, p-dibenzoylquinonedioxime, tetrachloro-p-benzoquinone, poly-p-dinitrosobenzene (about 0.5 phr to about 10 phr), methylenedianiline (about 0.05 phr to about 10 phr), and mixtures thereof. Further, if desired or necessary, one or more of a vulcanization accelerator may be added in combination with the vulcanization agent, including for example, an aldehyde-ammonia, guanidine, thiazole, sulfenamide, thiuram, dithio acid salt, thiurea, and mixtures thereof, for example, in an amounts of about 0.1 phr to about 5 phr or more.

The dynamic vulcanization process of the present invention is particularly distinguished from those generally known in the prior art as a consequence of the use of staged addition of at least one vulcanizable rubber or elastomer component. Consequently, the process employs several additions of at least one rubber component, preferably at least two such additions although three, four or more can also be used. However, in each instance, the staging is subject to the vulcanization criteria, including mixer residence time, as described above. As described herein, the preferred polymer components comprise halogenated isobutylene-containing copolymers as the vulcanizable component(s), e.g., halogenated butyl such as chlorinated butyl or brominated butyl, and brominated isobutylene-p-methylstyrene copolymer (BIMS copolymer), and a thermoplastic polymer such as nylon or a blend of various nylon polymers. It is particularly preferred that the dynamically vulcanized compositions of the present invention comprise the rubber component(s) as a dispersed, substantially fully cured, phase of small particle size in a continuous matrix of thermoplastic.

Without wishing to be bound by theory, it is believed that the fine rubber dispersions thus obtained in the compositions of the present invention are the result, in part, of the chemical reaction between, e.g., benzylic bromine present in BIMS, or allylic halogen in halogenated butyl, and terminal amines in polyamides at the phase boundary between the dispersed rubber particles and the thermoplastic formed during mixing. The presence of such interfacial reactions during blending and simultaneous reaction of two immiscible polymers avoids coalescence of the small particle size dispersed rubber phase, thereby leading to particularly fine dispersions of the rubber phase. The occurrence of such interfacial reactions is commonly referred to as "reactive compatibilization" and is described, e.g., in U.S. Pat. Nos. 5,571,864 and 6,469,087, incorporated herein by reference. At the same time, because of the interfacial stability in these reactive compatibilized immiscible systems, phase inversion of the higher concentration, lower viscosity polymer blend component, the rubber phase, is inhibited as a consequence of the stabilizing effect of interfacial compatibilization.

Ordinarily, in a polymer blend based on two polymers of different viscosity, polymer physics would dictate that the lower viscosity phase in such a blend is the continuous phase. (See, e.g., D. R. Paul and J. W. Barlow, J. Macromol. Sci., Rev. Macromol. Chem., C18 (1980), 109; V. I. Metelkin and V. S. Blekht, Kolloid. Zh., 46 (1984), 476, and L. A. Ultracki, J. Rheol., 35 (1991), 1615). The primary invention that eventually led to the introduction of commercial, dynamically vulcanized alloys, or DVA was that by A. M. Gessler, U.S. Pat. No. 3,037,954. Subsequent compositions based on EPDM and polypropylene were successfully developed and commercialized, (such as Santoprene®, Advanced Elastomer Systems), as a consequence of causing a higher concentration, lower viscosity EPDM component to be the dispersed phase by vulcanizing the EPDM during mixing of the polypropylene and EPDM in a mixer. Even in the absence of reactive compatibilization, vulcanization leads to the most significant increase in viscosity; in other words, the viscosity of a vulcanized component is effectively infinite and the thermoplastic phase can become the continuous phase. By imposing what amounts to phase inversion, the maximum rubber content of EPDM rubber in such systems can be increased to greater than 70 volume percent of rubbers.

Furthermore, while again not wishing to be bound by theory, it is believed that according to packing theory, the maximum volume fraction of mono-dispersed spheres that can be put into a fixed volume, based on a hexagonal close packing arrangement is 0.74 or 74% of the available volume. The maximum volume fractions achievable based on random close packing and cubic packing for mono-dispersed spheres are believed to be 0.64 and 0.52, respectively. These computations are described in R. K. McGeary, J. Am. Ceram. Soc., 44 (1961), 513. In polymer blends, the dispersions are poly-dispersed which is beneficial in maximizing the packed volume fraction. Taking these factors into consideration, it is expected that maximum packing volume of a poly-dispersed polymer in a binary polymer blend would be about 70 to about 80 volume percent. However, because interfacial stabilization prevents phase inversion, the maximum rubber content in the dynamically vulcanized polyamide/BIMS systems disclosed in EP 0 857 761 A1 and EP 0 969 039 A1 was limited to less than 60 volume %.

Higher rubber content can be achieved in the dynamically vulcanized compositions of the present invention as a consequence of further packing of rubber particles through multi-stage mixing, provided that the previously occluded rubbers are substantially fully stable and cannot coalesce into larger sized domains. This can be achieved by causing all rubber(s) incorporated in a given stage of mixing to be sufficiently cured, in other words, reaching at least about 50% of maximum cure, (preferably at least about 60%, preferably at least about 70%, preferably at least about 80%) before the next quantity of rubber is added, also referred to as the next stage of rubber addition. The preferred halogenated isobutylene elastomer content, typically present in the composition in the form of particles, is greater than about 60 volume %, most preferably greater than about 70 volume %. For example, the elastomer particles are present in an amount selected from the group consisting of greater than about 60 volume % to about 80 volume % (based upon the volume of the elastomer(s) and the engineering resin(s)); about 62 volume % to about 78 volume %; about 65 volume % to about 75 volume %; about 68 volume % to about 75 volume %; about 70 volume % to about 78 volume %; about 71 volume % to about 80 volume %; about 72 volume % to about 79 volume %; and about 71 volume % to about 80 volume %; for example wherein said elastomer particles comprise about 62 volume % to about 76 volume %. In the present invention, a thermoplastic elastomer composition having high rubber content is achieved by use of multistage addition of rubber(s) in which the cure rates of such rubbers are controlled to be less the mixer residence time, thereby achieving a sufficiently high state of cure. Dynamic vulcanization can be carried out in various types of commercial equipment generally available in the rubber and plastics industry including Banbury internal mixers, roll mixers, and mixing extruders. The preferred mixing equipment is a twin-screw extruder with intermeshing screw. As described above, mixing is generally conducted under such time and temperature conditions that the dispersed rubber particles are cured to the extent necessary to maintain their stability, i.e., to avoid coalescence of such particles prior to or during the addition of the next stage of rubber addition or completion of mixing of the composition. A suitable range of dynamic vulcanization temperatures is typically from about the melting temperature of the resin(s) to about 300° C.; for example, the temperature may range from about the melting temperature of the matrix resin(s) to about 275° C. Preferably dynamic vulcanization is carried out at a temperature range from about 10° C. to about 50° C. above the melting temperature of the matrix resin. More preferably the mixing temperature is about 20° C. to about 40° C. above the melting temperature of the polyamide or mixed polyamide thermoplastic matrix.

In one embodiment of the present invention the necessary amount of crosslinking agent(s) or cure system is dispersed in the elastomer component by mixing the crosslinking agent capable of crosslinking the elastomer into the elastomer component at a low to moderate temperature, insufficient to substantially activate the cure system, prior to contacting the thus compounded elastomer component with the resin component(s) for the purpose of carrying out dynamic vulcanization of the mixture. Furthermore, when the elastomer is added to the resin in stages or portions until the overall desired composition is achieved, each portion of the rubber composition can be the same, or, if desired, the amount of the cure system present in a portion of the rubber can be modified to achieve a desired effect, e.g., greater or lesser degree of crosslinking of a portion of the elastomer. By this method the crosslinking agent does not substantially react with the rubber, nor does it have an opportunity to partially react with the thermoplastic resin to cause either molecular weight degradation or crosslinking of the resin. Furthermore, control of the crosslinking rate and extent of crosslinking of the elastomer component is more readily achieved. Consequently, the compositions of the present invention exhibit improved properties.

One process for producing of the thermoplastic elastomer composition can be performed by the following procedure. First, a mixing device such as a Banbury mixer, two-roll rubber mill, etc. is used to pre-mix the elastomer component and predetermined amount of crosslinking agent until a substantially uniform dispersion is obtained. At this time, the elastomer component may have added thereto suitable amounts of optional fillers such as carbon black or modified carbon black, clay or modified clay oil and/or plasticizer. During this phase of mixing the temperature has to be controlled at a low enough level for the particular elastomer(s) selected and in consideration of the activity of the cure system, to avoid premature crosslinking of the elastomers. A useful temperature during this mixing step can be less than about 120° C.

The desired amount of the crosslinking agent-containing elastomer component thus prepared and the predetermined amount of nylon resin(s) are preferably charged into a twin-screw mixing extruder or other mixing device capable of effecting dynamic vulcanization under controlled conditions. The rubber component is made to dynamically crosslink, while effecting the melt mixing of the resin(s) to cause the elastomer component to disperse as a dispersed phase (domain) in the nylon resin which forms the continuous phase or matrix.

Further, various compounding agents other than vulcanization agents may be added to the nylon resin or elastomer component during the above mixing, but it is preferable to mix them in advance before the dynamic vulcanization step. The mixing device used for the carrying out dynamic vulcanization of the nylon resin and elastomer component is not particularly limited, including for example, a screw extruder, kneader, Banbury mixer, twin-screw mixing extruder, and the like. Among these, a twin-screw mixing extruder is preferably used for dynamic vulcanization. Alternatively, two or more types of mixers may be used in successive mixing operations. As the conditions for the dynamic vulcanization step involving melt mixing of the resin(s), the temperature should be at least the temperature at which the predetermined nylon resin melts, but preferably above the melting temperature as described above. Furthermore, the shear rate at the time of mixing is typically greater than about 500 $\sec^{-1}$; preferably about 500 to about 7500 $\sec^{-1}$; alternatively, about 1000 to about 7500 $\sec^{-1}$; for example about 2000 to about 7500 $\sec^{-1}$. The overall time of mixing during each stage of dynamic vulcanization is preferably about 30 seconds to about 10 minutes.

Since the process of the present invention involves multi-stage addition of the rubber component to the resin(s) or resin(s) plus previously dynamically vulcanized and dispersed elastomer, the above dynamic vulcanization step is repeated with at least one or more additional portions of the rubber composition until the total amount of rubber desired in the final thermoplastic composition is achieved. Consequently, this process will involve a minimum of two stages, but can be conducted in more than two such stages, e.g., three, four, five or more, as desired. Furthermore, the amount of rubber introduced in each stage can be varied, provided the total amount of rubber desired in the overall composition is achieved at the conclusion of all of the mixing operations and a suitable amount of rubber is introduced in each stage so as to achieve the desired small particle size and high volume percent of rubber in the final composition.

The thermoplastic elastomer composition thus obtained is structured with the elastomer component forming a discontinuous phase dispersed as a dispersion phase (domain) in a matrix of the nylon resin which forms a continuous phase. As a consequence of dynamic vulcanization, the composition remains thermoplastic and a film, layer or sheet-like structure of the composition can be formed using ordinary molding, extrusion or calendering. This result is illustrated in FIG. 1 which is a view of the microstructure shown by an atomic force microscope tapping phase micrograph (20 by 20 micron area) of the thermoplastic elastomer composition obtained according to the embodiment of Example 13 described below. The figure shows a high concentration of small particulate or globular areas of vulcanized brominated isobutylene paramethyl styrene elastomer dispersed in a continuous polyamide matrix, the continuous matrix having the appearance of a lighter region surrounding the discrete elastomer particles.

The composition described herein may also have one or more filler components such as calcium carbonate, clay, mica, silica and silicates, talc, titanium dioxide, starch and other organic fillers such as wood flour, and carbon black. Suitable filler materials include carbon black such as channel black, furnace black, thermal black, acetylene black, lamp black, modified carbon black such as silica treated or silica coated carbon black (described, for example, in U.S. Pat. No. 5,916,934, incorporated herein by reference), and the like. Reinforcing grade carbon black is preferred. The filler may also include other reinforcing or non-reinforcing materials such as silica, clay, calcium carbonate, talc, titanium dioxide and the like. The filler may be present at a level of from 0 to about 30 percent by weight of the rubber present in the composition.

Exfoliated, intercalated, or dispersed clays may also be present in the composition. These clays, also referred to as "nanoclays", are well known, and their identity, methods of preparation and blending with polymers is disclosed in, for example, JP 2000109635, JP 2000109605, JP 11310643; DE 19726278; WO98/53000; and U.S. Pat. Nos. 5,091,462, 4,431,755, 4,472,538, and 5,910,523. Swellable layered clay materials suitable for the purposes of the present invention include natural or synthetic phyllosilicates, particularly smectic clays such as montmorillonite, nontronite, beidellite, volkonskoite, laponite, hectorite, saponite, sauconite, magadite, kenyaite, stevensite and the like, as well as vermiculite, halloysite, aluminate oxides, hydrotalcite and the like. These layered clays generally comprise particles containing a plurality of silicate platelets having a thickness typically about 4 to about 20 Å in one embodiment, and about 8 to about 12 Å in another embodiment, bound together and containing exchangeable cations such as Na$^+$, Ca$^{+2}$, K$^+$ or Mg$^{+2}$ present at the interlayer surfaces.

Layered clay may be intercalated and exfoliated by treatment with organic molecules (swelling agents) capable of undergoing ion exchange reactions with the cations present at the interlayer surfaces of the layered silicate. Suitable swelling agents include cationic surfactants such as ammonium, alkylamines or alkylammonium (primary, secondary, tertiary and quaternary), phosphonium or sulfonium derivatives of aliphatic, aromatic or arylaliphatic amines, phosphines and sulfides. Desirable amine compounds (or the corresponding ammonium ion) are those with the structure $R_1R_2R_3N$, wherein $R_1$, $R_2$, and $R_3$ are $C_1$ to $C_{30}$ alkyls or alkenes which may be the same or different. In one embodiment, the exfoliating agent is a so-called long chain tertiary amine, wherein at least $R_1$ is a $C_{12}$ to $C_{20}$ alkyl or alkene.

Another class of swelling agents include those which can be covalently bonded to the interlayer surfaces. These include polysilanes of the structure —Si(R')$_2$R$^2$ where R' is the same or different at each occurrence and is selected from alkyl, alkoxy or oxysilane and R$^2$ is an organic radical compatible with the matrix polymer of the composite. Other suitable swelling agents include protonated amino acids and salts thereof containing 2-30 carbon atoms such as 12-aminododecanoic acid, epsilon-caprolactam and like materials. Suitable swelling agents and processes for intercalating layered silicates are disclosed in U.S. Pat. Nos. 4,472,538, 4,810,734, 4,889,885 and WO92/02582.

In a preferred embodiment of the invention, the exfoliating or swelling agent is combined with a halogenated polymer. In one embodiment, the agent includes all primary, secondary and tertiary amines and phosphines; alkyl and aryl sulfides and thiols; and their polyfunctional versions. Desirable additives include: long-chain tertiary amines such as N,N-dimethyl-octadecylamine, N,N-dioctadecyl-methylamine, dihydrogenated tallowalkyl-methylamine and the like, and amine-terminated polytetrahydrofuran; long-chain thiol and thiosulfate compounds such as hexamethylene sodium thiosulfate. In another embodiment of the invention, improved interpolymer impermeability is achieved by the use of polyfunctional curatives such as hexamethylene bis(sodium thiosulfate) and hexamethylene bis(cinnamaldehyde).

The amount of exfoliated, intercalated, or dispersed clay incorporated in the composition in accordance with this invention is an amount sufficient to develop an improvement in the mechanical properties or barrier properties of the composition, e.g. tensile strength or air/oxygen permeability. Amounts typically can be from about 0.5 to about 15 wt % in one embodiment, or about 1 to about 10 wt % in another embodiment, and about 1 to about 5 wt % in yet another embodiment, based on the polymer content of the composition. Expressed in parts per hundred rubber, the exfoliated, intercalated, or dispersed clay may be present at about 1 to about 30 phr in one embodiment, and about 3 to about 20 phr in another embodiment. In one embodiment, the exfoliating clay is an alkylamine-exfoliating clay.

As used herein, the term "process oil" means both the petroleum derived process oils and synthetic plasticizers. A process or plasticizer oil may be present in air barrier compositions. Such oils are primarily used to improve the processing of the composition during preparation of the layer, e.g., mixing, calendering, etc. Suitable plasticizer oils include aliphatic acid esters or hydrocarbon plasticizer oils such as paraffinic or naphthenic petroleum oils. The preferred plasticizer oil for use in standard, non-DVA, non-engineering resin-containing innerliner compositions is a paraffinic petroleum oil; suitable hydrocarbon plasticizer oils for use in such innerliners include oils having the following general characteristics.

| Property | Preferred | Minimum | Maximum |
|---|---|---|---|
| API gravity at 60° F. (15.5° C.) | 15-30 | 10 | 35 |
| Flash Point, (open cup method) ° F. (° C.) | 330-450 (165-232° C.) | 300 (148° C.) | 700 (371° C.) |
| Pour Point, ° F. (° C.) | 30 to +30 (−34 to −1° C.) | −35 (−37° C.) | 60 (15° C.) |

Generally, the process oil may be selected from paraffinic oils, aromatic oils, naphthenic oils, and polybutene oils. Polybutene process oil is a low molecular weight (less than 15,000 Mn) homopolymer or copolymer of olefin-derived units having from about 3 to about 8 carbon atoms, more preferably about 4 to about 6 carbon atoms. In another embodiment, the polybutene oil is a homopolymer or copolymer of a $C_4$ raffinate. Low molecular weight "polybutene" polymers is described in, for example, SYNTHETIC LUBRICANTS AND HIGH-PERFORMANCE FUNCTIONAL FLUIDS 357-392 (Leslie R. Rudnick & Ronald L. Shubkin, ed., Marcel Dekker 1999) (hereinafter "polybutene processing oil" or "polybutene"). Useful examples of polybutene oils are the PARAPOL™ series of processing oils (previously available form ExxonMobil Chemical Company, Houston Tex., now available from Infineum International Limited, Milton Hill, England under the "INFINEUM c, d, f or g tradename), including grades previously identified as PARAPOL™ 450, 700, 950, 1300, 2400, and 2500. Additionally preferred polybutene oils are SUNTEX™ polybutene oils available from Sun Chemicals. Preferred polybutene processing oils are typically synthetic liquid polybutenes having a certain molecular weight, preferably from about 420 Mn to about 2700 Mn. The molecular weight distribution -Mw/Mn- ("MWD") of preferred polybutene oils is typically about from 1.8 to about 3, preferably about 2 to about 2.8. The preferred density (g/ml) of useful polybutene processing oils varies from about 0.85 to about 0.91. The bromine number (CG/G) for preferred polybutene oils ranges from about 40 for the 450 Mn process oil, to about 8 for the 2700 Mn process oil.

Rubber process oils also have ASTM designations depending on whether they fall into the class of paraffinic, naphthenic or aromatic hydrocarbonaceous process oils. The type of process oil utilized will be that customarily used in conjunction with a type of elastomer component and a rubber chemist of ordinary skill in the art will recognize which type of oil should be utilized with a particular rubber in a particular application. For an innerliner composition the oil is typically present at a level of 0 to about 25 wt %; preferably about 5 to 20 wt % of the total composition. For a thermoplastic elastomer composition the oil may be present at a level of 0 to about 20 wt % of the total composition; preferably oil is not included in order to maximize impermeability of the composition.

In addition, plasticizers such as organic esters and other synthetic plasticizers can be used. A particularly preferred plasticizer for use in a DVA composition is N-butylsulfonamide or other plasticizers suitable for polyamides. In another embodiment, rubber process oils such as naphthenic, aromatic or paraffinic extender oils may be present at about 1 to about 5 phr. In still another embodiment, naphthenic, aliphatic, paraffinic and other aromatic oils are substantially absent from the composition. By "substantially absent", it is meant that naphthenic, aliphatic, paraffinic and other aromatic oils may be present, if at all, to an extent no greater than 2 phr in the composition.

The degree of cure of the vulcanized rubber can be described in terms of gel content, cross-link density, the amount of extractable components or it can be based on the state of cure that would be achieved in the rubber were it to be cured in the absence of the resin. For example, in the present invention, it is preferred that the halogenated elastomer achieve about 50 to about 85% of full cure based on the elastomer per se as measured, e.g., by tensile strength or using the oscillating disc cure meter test (ASTM D 2084, Standard Test Method for Rubber Property-Vulcanization Using Oscillating Disk Cure Meter).

By molding the thermoplastic elastomer composition obtained into a sheet, film, or tube using a T-sheeting die, straight or crosshead structure tubing die, inflation molding cylindrical die, etc. at the end of a single-screw extruder, or by calendering, it is possible to use the composition as the air permeation preventive layer, e.g., an innerliner, of a pneumatic tire and as a component or layer of a hose, etc. The thermoplastic elastomer compositions of the present invention may be taken up into strands once, pelletized, then molded by using a single-screw extruder that is typically used for resin.

The sheet or tubular molded article thus obtained can be effectively used for an innerliner layer of a pneumatic tire or the hose tube or hose cover of a low gas permeable hose. Furthermore, the low permeability characteristics of the composition are suitable for uses with fluids other than gasses, e.g., liquids such as water, hydraulic fluid, brake fluid, heat transfer fluid, etc., provided that the layer in direct contact with the fluid has suitable resistance to the fluid being handled.

Any range of numbers recited in the specification hereinabove or in the paragraphs and claims hereinafter, referring to various aspects of the invention, such as that representing a particular set of properties, units of measure, conditions, physical states or percentages, is intended to literally incorporate expressly herein by reference or otherwise, any number falling within such range, including any subset of numbers or ranges subsumed within any range so recited. Furthermore, the term "about" when used as a modifier for, or in conjunction with, a variable, characteristic or condition is intended to convey that the numbers, ranges, characteristics and conditions disclosed herein are flexible and that practice of the present invention by those skilled in the art using temperatures, times, concentrations, amounts, contents, carbon numbers, properties such as particle size, surface area, bulk density, etc., that are outside of the range or different from a single value, will achieve the desired result, namely, an dynamically vulcanized, high elastomer-content composition comprising at least one isobutylene-containing elastomer and at least one thermoplastic suitable for use, for example, in a pneumatic tire or hose, or as a tire innerliner.

EXAMPLES

The following commercially available products were used for the components employed in the Examples

| | Description |
|---|---|
| Rubber Components | |
| BIIR | Bromobutyl ™ 2222 (brominated isobutylene isoprene copolymer, 2% Br, ExxonMobil Chemical Company, Houston Texas) |
| BIMS-2 | Exxpro ™ 96-1 (brominated isobutylene p-methyl styrene copolymer, 0.5% Br, 5% PMS, ExxonMobil Chemical Company Houston Texas) |
| BIMS-1 | Exxpro ™ 89-4 (brominated isobutylene p-methyl styrene copolymer, 0.75% Br, 5% PMS, ExxonMobil Chemical) |
| NR | SMR-20 natural rubber (Standard Malaysian Rubber) |
| SBR | Copo ™-1502 (styrene-butadiene rubber, 23.5% bound styrene, DSM Copolymer, Netherlands) |
| Cure System Components | |
| ZnO | Zinc oxide - cure system component |
| St-acid | Stearic acid - cure system component |
| ZnSt | Zinc state - cure system component |
| S | sulfur - cure system component |
| MBTS | sulfur-containing cure system accelerator2,2'-benzothiazyl disulfide |
| C1 | Cure modifier1, 6PPD, N-(1,3-dimethylbutyl)-N'-phenyl-p-phenylenediamine |
| C2 | Cure modifier 2, Armeen DMHR, dimethyl hydrogenated rapeseed ($C_{20}$-$C_{22}$) tertiary amine, Akzo Nobel |
| Additive Components | |
| Struktol 40MS | Compound compatibilizer (mixture of dark aromatic hydrocarbon resins, Struktol Company) |
| Calsol 810 | naphthenic processing oil (Calumet Lubricants) |
| Flectol | Flectol TMQ antioxidant (polymerized 1,2-dihydro-2,2,4-trimethylquinoline, Flexsys America) |
| N660 | Carbon black (semi-reinforcing grade) |
| N39S2 | Silica coated carbon black |
| T1 | SP1068 (tackifier 1 - alkyl phenol formaldehyde resin, Schenectady International) |
| T2 | G100 (tackifier 2 - synthetic polyterpene resin (Quintone brand, Nippon Zeon Chemicals) |
| T3 | Sylvalite RE100L (tackifier 3 - pentaerythritol ester of rosin, Arizona Chemical) |
| Engineering Resin Component | |
| N11 | Nylon 11 available as Rilsan BMN O from Arkema |
| N6/66-1 | Nylon 6/66 copolymer available as Ube 5033B from Ube |

-continued

| | Description |
|---|---|
| N6/66-2 | Nylon 6/66 copolymer available as Ube 5034B from Ube |
| N6/66-3 | Nylon 6/66 copolymer available as CM6001FS available from Toray |
| Additive Component | |
| P | Plasticizer, BM4, N-butylsulfonamide |
| C | Compatibilizer, AR201, maleated EVA copolymer DuPont-Mitsui |
| S1 | Stabilizer 1, package includes Irganox, Tinuvin, and Copper Iodide (CuI) |
| S2 | Stabilizer 2, package includes Irgafos 168; (tris(2,4-di-(tert)-butylphenyl)phosphite) (Ciba Specialty Chemicals) |

In accordance to formulations listed in Table 1, where compositions are expressed as parts per hundred of rubber or phr (unless otherwise noted), examples 1 to 4 were prepared using a dynamic vulcanization process carried out in a twin-screw extruder at 230° C. Specifically, the DVA's were prepared according to the procedure described in EP 0 969 039, with specific reference to the section entitled "Production of Thermoplastic Elastomer Composition." The elastomer component and vulcanization system were charged into a kneader, mixed for approximately 3.5 minutes, and dumped out at about 90° C. to prepare an elastomer component with a vulcanization system. The mixture was then pelletized by a rubber pelletizer. Next, the elastomer component and resin components were charged into a twin screw mixing extruder and dynamically vulcanized to prepare a thermoplastic elastomer composition. BIMS content was steadily increased until phase inversion was observed, i.e., until the BIMS phase became continuous. BIMS content was increased in Table 1 from Example 1 to Example 4 by raising the elastomer component feed to the extruder according to the formulations specified in Table 1. As shown in Table 1, poor dispersion resulted at 62.5% rubber content and phase inversion, when the BIMS rubber phase became continuous, occurred at 70% rubber content. Good extrudate quality, typically characterized by a smooth surface and constant strand diameter, was obtained only for the compositions of examples 1 and 2, as shown in Table 1.

TABLE 1

| | Example | | | |
|---|---|---|---|---|
| | 1 | 2 | 3 | 4 |
| BIMS-2 | 100 | 100 | 100 | 100 |
| ZnO | 0.15 | 0.15 | 0.15 | 0.15 |
| St-acid | 0.60 | 0.60 | 0.60 | 0.60 |
| ZnSt | 0.30 | 0.30 | 0.30 | 0.30 |
| N11 | 44.6 | 40.2 | 36.2 | 28.4 |
| N6/66-1 | 30.7 | 27.7 | 24.9 | 19.5 |
| P | 10.5 | 9.5 | 8.6 | 6.7 |
| S | 0.87 | 0.79 | 0.71 | 0.56 |
| BIMS vol % | 57.5 | 60 | 62.5 | 70 |
| Quality | Good | Good | Poor | Phase inverted |
| M50 (MPa) | 6.4 | 5.9 | 5.8 | NM |
| Elongation (%) | 370 | 340 | 320 | NM |
| Fatigue (cycles) | 1.5 M | 2.5 M | 2.3 M | NM |

M50: 50% modulus at room temperature measured according to ASTM D412-92;
Elongation: elongation to break at room temperature measured according to ASTM D412-92;
Fatigue: samples tested at 40% strain amplitude in tensile mode running at 6.67 Hz and at room temperature; fatigue resistance expressed in cycles to failure.
M means million.
NM means cannot be measured According to the phase continuity criterion, raising the BIMS rubber viscosity could further extend the rubber content. In examples 5-9, 20 phr of silica coated carbon black filler was added to the rubber composition to increase the viscosity of the rubber composition. The elastomer components, BIMS rubber and its viscosity modifier of silica coated carbon black, were mixed in a Banbury mixer for 3 to 5 minutes and dumped at 120° C. Subsequently, the rubber-carbon black mixes were accelerated with the curatives in a kneader and dumped at about 90° C. These elastomer mixtures were then pelletized by a rubber pelletizer and used as the elastomer component feeds for the twin screw extrusion mixing with nylons. All nylon and elastomer components were metered to a twin screw extrusion mixer running at 230° C. and at 100 rpm. As shown in Table 2, phase inversion still occurred at 70 volume % of rubber although good quality mixing can be obtained with rubber content up to 62.5 volume %. However, fatigue resistance of the carbon black filler containing, dynamic vulcanized polyamide/BIMS blends is compromised in these compositions.

TABLE 2

| | Example | | | | |
|---|---|---|---|---|---|
| | 5 | 6 | 7 | 8 | 9 |
| BIMS-2 | 100 | 100 | 100 | 100 | 100 |
| N39S2 | 20 | 20 | 20 | 20 | 20 |
| ZnO | 0.15 | 0.15 | 0.15 | 0.15 | 0.15 |
| St-acid | 0.60 | 0.60 | 0.60 | 0.60 | 0.60 |
| ZnSt | 0.30 | 0.30 | 0.30 | 0.30 | 0.30 |
| N11 | 49.1 | 44.3 | 39.9 | 35.8 | 28.7 |
| N6/66-1 | 33.8 | 30.5 | 27.4 | 24.6 | 19.7 |
| P | 11.6 | 10.5 | 9.4 | 8.5 | 6.8 |
| S1 | 0.96 | 0.87 | 0.78 | 0.69 | 0.56 |
| BIMS vol % | 57.5 | 60 | 62.5 | 65 | 70 |
| Quality | Good | Good | Good | Poor | Phase inverted |
| M50 (MPa) | 7.8 | 7.0 | 6.3 | 5.6 | NM |
| Elongation (%) | 300 | 340 | 360 | 370 | NM |
| Fatigue | 1.0 M | 0.6 M | 0.7 M | 0.7 M | NM |

M50: 50% modulus at room temperature measured according to ASTM D412-92;
Elongation: elongation to break at room temperature measured according to ASTM D412-92;
Fatigue: samples tested at 40% strain amplitude in tensile mode running at 6.67 Hz and at room temperature; fatigue resistance expressed in cycles to failure.
M means million.
NM means cannot be measured Examples 10 to 14 were prepared using a ZSK-30 co-rotating intermeshing twin screw extruder with 29 length to diameter (L/D) screw and a residence time of about 1 minute at 100 RPM. As indicated in Table 3, example 10 with long cure time, greater than 60 minutes, encountered phase inversion during the first mix. C1 and C2 are the two cure modifiers in combination with S2 stabilizer and were adjusted to provide different cure times. Curatives were pre-dispersed in BIMS rubber using a Banbury internal mixer running at 60 RPM with a dump temperature of 100° C. Curatives-containing BIMS rubber composition was then pelletized using a granulator prior to being fed to the mixing extruder. The cure time of example 11 is slightly higher than the residence time of the extruder and, in turn, led to phase inversion during the second mixing. When the cure time is less than 1 minute, as that of examples 12-14, acceptable extrusion quality with high rubber contents could be obtained in two-stage mixing.

As shown in Tables 1 and 2, the maximum rubber content achievable by the one-stage mixing, even with the increase in rubber viscosity, is 62.5%. Table 3 deals with two stage mixing.

TABLE 3

|  | Example | | | | |
| --- | --- | --- | --- | --- | --- |
|  | 10 | 11 | 12 | 13 | 14 |
| BIMS-1 | 100 | 100 | 100 | 100 | 100 |
| ZnO | 0 | 1.0 | 0.5 | 0.5 | 0.5 |
| St. acid | 0 | 1.5 | 0.5 | 0.5 | 0.5 |
| C1 | 1 | 0 | 1 | 1 | 1 |
| C2 | 0.5 | 0.5 | 0.5 | 0 | 0 |
| N6/66-2 | 120 | 0 | 0 | 0 | 0 |
| N6/66-3 | 0 | 78 | 78 | 78 | 49 |
| S2 | 0.6 | 0.4 | 0.4 | 0.4 | 0.25 |
| Cure time | >60 | 1.09 | 0.79 | 0.70 | 0.70 |
| First Mix** | 55/45 | 55/45 | 55/45 | 55/45 | 55/45 |
| Rubber particle size | NM | 0.18 | 0.29 | 0.20 | 0.20 |
| Second Mix** | NM | 80/20 | 80/20 | 80/20 | 70/30 |
| Final rubber vol % | — | 62 | 62 | 62 | 73 |
| Rubber particle size | NM | NM | 0.17 | 0.22 | 0.24 |
| Observation | Phase inverted | Phase inverted | Good | Good | Good |
| M50 (MPa) | NM | NM | 16 | 21 | 8.5 |

Cure Time is cure time in minutes measured based on time required to reach 50% cure at 230° C. using MDR curemeter (ASTM D2084-92A);
Rubber particle size: number average rubber dispersion diameter in microns measured by tapping phase atomic force microscope and image processing;
NM: cannot be measured, since phase inversion was encountered;
M50: 50% modulus at room temperature imeasured according to ASTM D412-92
First Mix** 55/45 means addition of 55 wt. % Nylon and 45 wt. % (approximately 50 vol. %) rubber.
Second Mix** 80/20 means addition of 80 parts by weight of the first mix composition plus 20 parts by weight of rubber.
Second Mix** 70/30 means addition of 70 parts by weight of the first mix composition plus 30 parts by weight of rubber.

Melt viscosity properties of components and mixtures were also measured with the following results (melt viscosity at 230° C. and 1216 sec$^{-1}$ shear rate measured using a Monsanto processability tester):

TABLE 4

| Component or mixture | Viscosity (Pa-s) |
| --- | --- |
| Exxpro 89-4 | 250 |
| N6/66-1 | 600 |
| N6/66-2 | 600 |
| N6/66-3 | 150 |
| N11 | 200 |
| First Mix | 200 |

Thus, the viscosity ratio of the resin to the rubber during the first mix is 0.6 and the viscosity ratio of the first mix to the rubber during the second mix is 0.8. Furthermore, since the viscosity of a mixture of the rubber plus cure system in the absence of crosslinking would be substantially the same as that of the rubber, a similar ratio would be obtained.

All documents described herein are incorporated by reference herein, including any priority documents and/or testing procedures to the extent they are not inconsistent with this text. The principles, preferred embodiments, and modes of operation of the present invention have been described in the foregoing specification. Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims. Likewise, the term "comprising" is considered synonymous with the term "including" for purposes of Australian law.

Various aspects or embodiments of the present invention are set forth in the following enumerated paragraphs: This invention relates to:

1. A thermoplastic elastomer composition comprising
    (A) at least one halogenated isobutylene-containing elastomer; and
    (B) at least one nylon resin having a melting point of about 170° C. to about 230° C.; wherein:
    (1) said at least one elastomer is present as a dispersed phase of small vulcanized particles in a continuous phase of said nylon;
    (2) said elastomer particles have been formed by dynamic vulcanization; and
    (3) said elastomer particles comprising greater than about 60 volume % of the volume of said elastomer and said resin.
2. The composition according to paragraph 1 wherein said elastomer particles are present in an amount selected from the group consisting of greater than about 60 volume % to about 80 volume %; about 62 volume % to about 78 volume %; about 65 volume % to about 75 volume %; about 68 volume % to about 75 volume %; about 70 volume % to about 78 volume %; about 71 volume % to about 80 volume %; and about 72 volume % to about 79 volume %.
3. The composition according to paragraph 1 wherein said elastomer particles comprise greater than about 65 volume %.
4. The composition according to paragraph 1 wherein said elastomer particles comprise greater than about 62 volume %.
5. The composition according to paragraph 1 wherein said elastomer particles comprise about 62 volume % to about 78 volume %.
6. The composition according to paragraph 1 wherein said elastomer particles comprise about 62 volume % to about 76 volume %.
7. The composition according to paragraph 1 wherein the degree of cure of said elastomer particles is at least about 50% of the maximum degree of cure that said elastomer is capable of reaching based on the composition and conditions under which said elastomer is vulcanized.
8. The composition according to paragraph 7 wherein said degree of cure is selected from the group consisting of about 60% to greater than about 95%; about 65% to about 95%; about 70% to about 95%; about 75% to greater than about 90%; about 80% to about 98%; about 85% to about 95%; and about 85% to about 99%.
9. The composition according to paragraph 7 wherein said degree of cure is at least about 80%.
10. The composition according to paragraph 1 further comprising at least one component selected from the group consisting of fillers and plasticizers.
11. The composition according to paragraph 1 wherein said nylon resin comprises a mixture of (i) nylon 11 or nylon 12;

and (ii) nylon 6/66 copolymer, and a composition ratio of (i)/(ii) is about 10/90 to about 90/10.

12. The composition according to paragraph 11 wherein said composition ratio of (i)/(ii) is about 30/70 to about 85/15.

13. The composition according to paragraph 1 wherein said at least one halogenated isobutylene-containing elastomer is selected from the group consisting of halogenated butyl rubber, halogenated isoolefin/para-alkylstyrene copolymer, halogenated isobutylene-p-methylstyrene-isoprene copolymer, halogenated branched butyl rubber and halogenated star-branched butyl rubber.

14. The composition according to paragraph 13 wherein said halogenated butyl rubber halogenated butyl rubber comprises a high content of the following halogenated structure, where X represents a halogen:

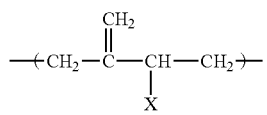

15. The composition according to paragraph 13 or paragraph 14 wherein the halogen is selected from the group consisting of bromine and chlorine.

16. The composition according to paragraph 13 wherein said halogenated isoolefin/para-alkylstyrene copolymer copolymers comprises a $C_4$ to $C_7$ isoolefin.

17. The composition according to paragraph 16 wherein said halogenated isoolefin/para-alkylstyrene copolymer comprises a halogenated poly(isobutylene-co-p-methylstyrene) copolymer.

18. The composition according to paragraph 17 wherein said halogen is bromine.

19. A pneumatic tire comprising an air permeation preventive layer comprising a thermoplastic elastomer composition according to paragraph 1.

20. A hose comprising a thermoplastic elastomer composition according to paragraph 1 as at least one layer of a hose tube material.

21. A process conducted in a suitable mixer for producing a thermoplastic elastomer composition, said mixer having a characteristic residence time, said composition comprising greater than about 60 volume % of dispersed particles of a total amount of at least one halogenated isobutylene-containing elastomer, said particles dispersed in a continuous thermoplastic nylon resin matrix, said process comprising the steps of:

(1) mixing halogenated elastomer-containing composition (A), said composition (A) comprising a first fraction of the total amount of halogenated elastomer in said thermoplastic elastomer composition and further comprising a cure system for said first elastomer fraction; and thermoplastic nylon resin (B) under suitable dynamic vulcanization conditions of time, temperature and shear to form composition (C);

(2) mixing composition (C) and halogenated elastomer-containing composition (D), said composition (D) comprising a second fraction of the total amount of halogenated elastomer in said thermoplastic elastomer composition and further comprising a cure system for said second elastomer fraction; under suitable dynamic vulcanization conditions of time, temperature and shear to form composition (E);

(3) if the sum of said first and second fractions of halogenated elastomer is less than the total amount of halogenated elastomer in said thermoplastic elastomer composition, mixing composition (E) and halogenated elastomer-containing composition (F), said composition (F) comprising a third fraction of the total amount of halogenated elastomer in said thermoplastic elastomer composition and further comprising a cure system for said third elastomer fraction; under suitable dynamic vulcanization conditions of time, temperature and shear to form composition (G); wherein the step of dynamically vulcanizing a fractional additional amount of halogenated elastomer in the presence of the dynamically vulcanized composition of the preceding step is repeated as many times as necessary in order to obtain the total amount of halogenated elastomer in said thermoplastic elastomer composition; and wherein each said dynamic vulcanization conditions at each step are sufficient to effect a cure state in said elastomer particles of at least about 50% of the maximum cure state for said elastomer and cure system and wherein said dynamic vulcanization time period is equal to or less than about the characteristic residence time of said mixer.

22. The process according to paragraph 21 comprising two fractional additions of said halogenated elastomer.

23. The process according to paragraph 21 comprising at least three fractional additions of said halogenated elastomer.

24. The process according to paragraph 21 wherein said elastomer particles are present in an amount selected from the group consisting of greater than about 60 volume % to about 80 volume %; about 62 volume % to about 78 volume %; about 65 volume % to about 75 volume %; about 68 volume % to about 75 volume %; about 70 volume % to about 78 volume %; about 71 volume % to about 80 volume %; about 72 volume % to about 79 volume %; and about 71 volume % to about 80 volume %.

25. The process according to paragraph 21 wherein said elastomer particles comprise greater than about 65 volume %.

26. The process according to paragraph 21 wherein said elastomer particles comprise greater than about 62 volume %.

27. The process according to paragraph 21 wherein said elastomer particles comprise about 62 volume % to about 78 volume %.

28. The process according to paragraph 21 wherein said elastomer particles comprise about 62 volume % to about 76 volume %.

29. The process according to paragraph 21 wherein said degree of cure is selected from the group consisting of about 60% to greater than about 95%; about 65% to about 95%; about 70% to about 95%; about 75% to greater than about 90%; about 80% to about 98%; about 85% to about 95%; and about 85% to about 99%.

30. The process according to paragraph 21 wherein said degree of cure is at least about 80%.

31. The process according to paragraph 21 wherein said elastomer containing composition further comprises at least one component selected from the group consisting of fillers and plasticizers.

32. The process according to paragraph 21 wherein said nylon resin comprises a mixture of (i) nylon 11 or nylon 12; and (ii) nylon 6/66 copolymer, and a composition ratio of (i)/(ii) is about 10/90 to about 90/10.

33. The process according to paragraph 32 wherein said composition ratio of (i)/(ii) is about 30/70 to about 85/15.

34. The process according to paragraph 21 wherein said at least one halogenated isobutylene-containing elastomer is selected from the group consisting of halogenated butyl rubber, halogenated isoolefin/para-alkylstyrene copolymer, halogenated isobutylene-p-methylstyrene-isoprene copolymer, halogenated branched butyl rubber and halogenated star-branched butyl rubber.

35. The process according to paragraph 34 wherein said halogenated butyl rubber halogenated butyl rubber comprises a high content of the following halogenated structure, where X represents a halogen:

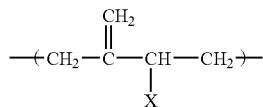

36. The process according to paragraph 34 or paragraph 35 wherein the halogen is selected from the group consisting of bromine and chlorine.
37. The process according to paragraph 34 wherein said halogenated isoolefin/para-alkylstyrene copolymer copolymers comprises a $C_4$ to $C_7$ isoolefin.
38. The process according to paragraph 37 wherein said halogenated isoolefin/para-alkylstyrene copolymer comprises a halogenated poly(isobutylene-co-p-methylstyrene) copolymer.
39. The process according to paragraph 38 wherein said halogen is bromine.

The invention claimed is:

1. A thermoplastic elastomer composition comprising (A) at least one halogenated isobutylene-containing elastomer; and (B) at least one nylon resin having a melting point of about 170° C. to about 230° C.; wherein:
   (1) said at least one halogenated isobutylene-containing elastomer is present as a dispersed phase of small vulcanized or partially vulcanized particles in a continuous phase of said nylon;
   (2) said halogenated isobutylene-containing elastomer particles have been formed by dynamic vulcanization; and
   (3) said halogenated isobutylene-containing elastomer particles comprising greater than about 60 volume % of the volume of said elastomer and said resin being obtained by a process comprising the steps of:
   (1) mixing halogenated elastomer-containing composition (A') comprising a first fraction of the total amount of halogenated elastomer in said thermoplastic elastomer composition and further comprising a cure system for said first elastomer fraction; and thermoplastic nylon resin (B) under suitable dynamic vulcanization conditions of time, temperature and shear to form composition (C);
   (2) mixing composition (C) and halogenated elastomer-containing composition (D), said composition (D) comprising a second fraction of the total amount of halogenated elastomer in said thermoplastic elastomer composition and further comprising a cure system for said second elastomer fraction; under suitable dynamic vulcanization conditions of time, temperature and shear to form composition (E);
   (3) if the sum of said first and second fractions of halogenated elastomer is less than the total amount of halogenated elastomer in said thermoplastic elastomer composition, mixing composition (E) and halogenated elastomer-containing composition (F), said composition (F) comprising a third fraction of the total amount of halogenated elastomer in said thermoplastic elastomer composition and further comprising a cure system for said third elastomer fraction; under suitable dynamic vulcanization conditions of time, temperature and shear to form composition (G); wherein the step of dynamically vulcanizing a fractional additional amount of halogenated elastomer in the presence of the dynamically vulcanized composition of the preceding step is repeated as many times as necessary in order to obtain the total amount of halogenated elastomer in said thermoplastic elastomer composition; and wherein each said dynamic vulcanization conditions at each step are sufficient to effect a cure state in said elastomer particles of at least about 50% of the maximum cure state for said elastomer and cure system and wherein said dynamic vulcanization time period is equal to or less than about the characteristic residence time of said mixer.

2. The composition according to claim 1 wherein said elastomer particles are present in an amount of greater than 60 volume % to 80 volume %.
3. The composition according to claim 1 wherein the degree of cure of said elastomer particles is at least about 50% of the maximum degree of cure that said elastomer is capable of reaching based on the composition and conditions under which said elastomer is vulcanized.
4. The composition according to claim 1 wherein said nylon resin comprises a mixture of (i) nylon 11 or nylon 12; and (ii) nylon 6/66 copolymer, and a composition ratio of (i)/(ii) is about 10/90 to about 90/10.
5. The composition according to claim 1 wherein said at least one halogenated isobutylene-containing elastomer is selected from the group consisting of halogenated butyl rubber, halogenated isobutylene/para-alkylstyrene copolymer, halogenated isobutylene-p-methylstyrene-isoprene copolymer, halogenated branched butyl rubber and halogenated star-branched butyl rubber.
6. The composition according to claim 5 wherein said at least one halogenated isobutylene-containing elastomer comprises a halogenated isobutylene/para-alkylstyrene copolymer.
7. The composition according to claim 1 wherein said halogenated butyl rubber comprises a high content of the following halogenated structure,

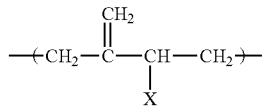

where X represents a halogen.

8. The composition according to claim 7 wherein the halogen is selected from the group consisting of bromine and chlorine.
9. The composition of claim 1, the composition being incorporated into an article, the article being an air permeation prevention layer of a pneumatic tire or a layer of a hose material.
10. A process conducted in a mixer for producing a thermoplastic elastomer composition, said mixer having a characteristic residence time, said composition comprising greater than about 60 volume % of dispersed particles of a total amount of at least one halogenated isobutylene-containing elastomer, said particles dispersed in a continuous thermoplastic nylon resin matrix, said process comprising the steps of:
   (1) mixing halogenated elastomer-containing composition (A'), said composition (A') comprising a first fraction of the total amount of halogenated elastomer in said thermoplastic elastomer composition and further comprising a cure system for said first elastomer fraction; and thermoplastic nylon resin (B) under suitable dynamic vulcanization conditions of time, temperature and shear to form composition (C);

(2) mixing composition (C) and halogenated elastomer-containing composition (D), said composition (D) comprising a second fraction of the total amount of halogenated elastomer in said thermoplastic elastomer composition and further comprising a cure system for said second elastomer fraction; under suitable dynamic vulcanization conditions of time, temperature and shear to form composition (E);

(3) if the sum of said first and second fractions of halogenated elastomer is less than the total amount of halogenated elastomer in said thermoplastic elastomer composition, mixing composition (E) and halogenated elastomer-containing composition (F), said composition (F) comprising a third fraction of the total amount of halogenated elastomer in said thermoplastic elastomer composition and further comprising a cure system for said third elastomer fraction; under suitable dynamic vulcanization conditions of time, temperature and shear to form composition (G); wherein the step of dynamically vulcanizing a fractional additional amount of halogenated elastomer in the presence of the dynamically vulcanized composition of the preceding step is repeated as many times as necessary in order to obtain the total amount of halogenated elastomer in said thermoplastic elastomer composition; and wherein each said dynamic vulcanization conditions at each step are sufficient to effect a cure state in said elastomer particles of at least about 50% of the maximum cure state for said elastomer and cure system and wherein said dynamic vulcanization time period is equal to or less than about the characteristic residence time of said mixer.

11. The process according to claim 10 comprising two fractional additions of said halogenated elastomer.

12. The process according to claim 10 comprising at least three fractional additions of said halogenated elastomer.

13. The process according to claim 10 wherein said elastomer particles are present in an amount of greater than about 60 volume % to about 80 volume %.

14. The process according to claim 10, wherein said degree of cure is about 60% to about 99%.

15. The process according to claim 10, wherein said nylon resin comprises a mixture of (i) nylon 11 or nylon 12; and (ii) nylon 6/66 copolymer, and a composition ratio of (i)/(ii) is about 10/90 to about 90/10.

16. The process according to claim 10 wherein said at least one halogenated isobutylene-containing elastomer is selected from the group consisting of halogenated butyl rubber, halogenated isobutylene/para-alkylstyrene copolymer, halogenated isobutylene-p-methylstyrene-isoprene copolymer, halogenated branched butyl rubber and halogenated star-branched butyl rubber.

17. The process according to claim 16 wherein said halogenated butyl rubber halogenated butyl rubber comprises a high content of the following halogenated structure,

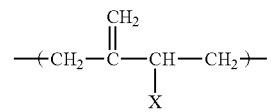

where X represents a halogen.

18. The process according to claim 17 wherein the halogen is selected from the group consisting of bromine and chlorine.

19. The process according to claim 16 wherein said at least one halogenated isobutylene-containing elastomer comprises a halogenated isobutylene/para-alkylstyrene copolymer.

20. A thermoplastic elastomer composition consisting essentially of a dynamically vulcanized mixture of:

(A) brominated isobutylene-p-methylstyrene elastomer; and (B) nylon 6/66 copolymer resin; wherein said elastomer is present as a dispersed phase of small, dynamically vulcanized particles in a continuous phase of said nylon and said elastomer particles comprise about 73 volume % of the volume of said elastomer and said resin; and wherein (1) said dynamic vulcanization is conducted in two stages in a twin screw extruder having a residence time of about 1 minute; (2) using said elastomer in which a cure system is previously dispersed, said cure system exhibiting a cure time to at least 50% of maximum cure of the elastomer of less than said residence time of the extruder; (3) during the first stage of which a mixture of 55 weight percent Nylon and 45 weight percent elastomer are dynamically vulcanized and during the second stage of which 70 parts by weight of the mixture produced in the first stage is further dynamically vulcanized with 30 parts by weight of elastomer.

* * * * *